United States Patent [19]

Boivie

[11] 4,453,217

[45] Jun. 5, 1984

[54] DIRECTORY LOOKUP METHOD AND APPARATUS

[75] Inventor: Richard H. Boivie, Middletown, N.J.

[73] Assignee: Bell Telephone Laboratories, Incorporated, Murray Hill, N.J.

[21] Appl. No.: 337,093

[22] Filed: Jan. 4, 1982

[51] Int. Cl.³ ............................................. G06F 15/40
[52] U.S. Cl. .................................... 364/300; 364/200
[58] Field of Search ........................ 364/200, 300, 900

[56] References Cited

U.S. PATENT DOCUMENTS

| | | |
|---|---|---|
| 3,259,883 | 7/1966 | Rabinow et al. |
| 3,533,069 | 10/1970 | Garry |
| 3,928,724 | 12/1975 | Byram et al. |
| 4,010,445 | 3/1977 | Hoshino |
| 4,020,473 | 4/1977 | Fujimura ............................ 364/200 |
| 4,164,029 | 8/1979 | Dubnowski et al. ............... 364/900 |

OTHER PUBLICATIONS

Kernighan et al., "Unix Time-Sharing System: Document Preparation", *The Bell System Tech. Journal*, vol. 57, No. 6, Aug. 1978, pp. 2115-2135.

Peterson, J. L., "Computer Programs for Detecting and Correcting Spelling Errors", *Communications of the ACM*, vol. 23, No. 12, Dec. 1980, pp. 676-687.

*Primary Examiner*—Raulfe B. Zache
*Attorney, Agent, or Firm*—David H. Tannenbaum

[57] ABSTRACT

There is disclosed a spelling correction arrangement for use in directory lookup applications. The arrangement corrects errors by finding the name in the directory that most closely resembles the name requested by the user. The arrangement is based on a recursive routine that continually subdivides the problem of finding a given name in a given directory into smaller subproblems in which shorter names are to be found in smaller directories. Multiple spelling errors are easily accommodated since the technique uses the given directory of names to limit the search. The technique allows the algorithm to find the closest name in the directory without actually considering the vast majority of the names that appear in the directory.

59 Claims, 22 Drawing Figures

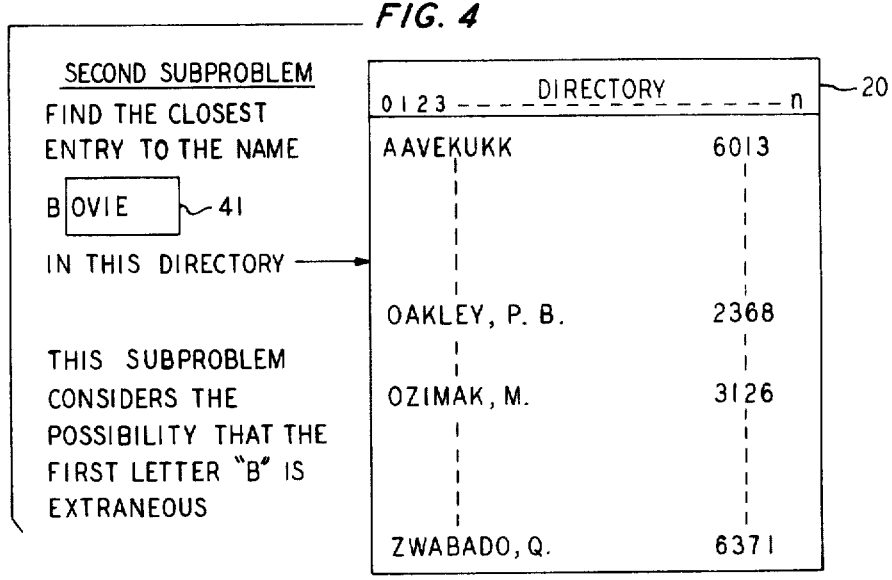
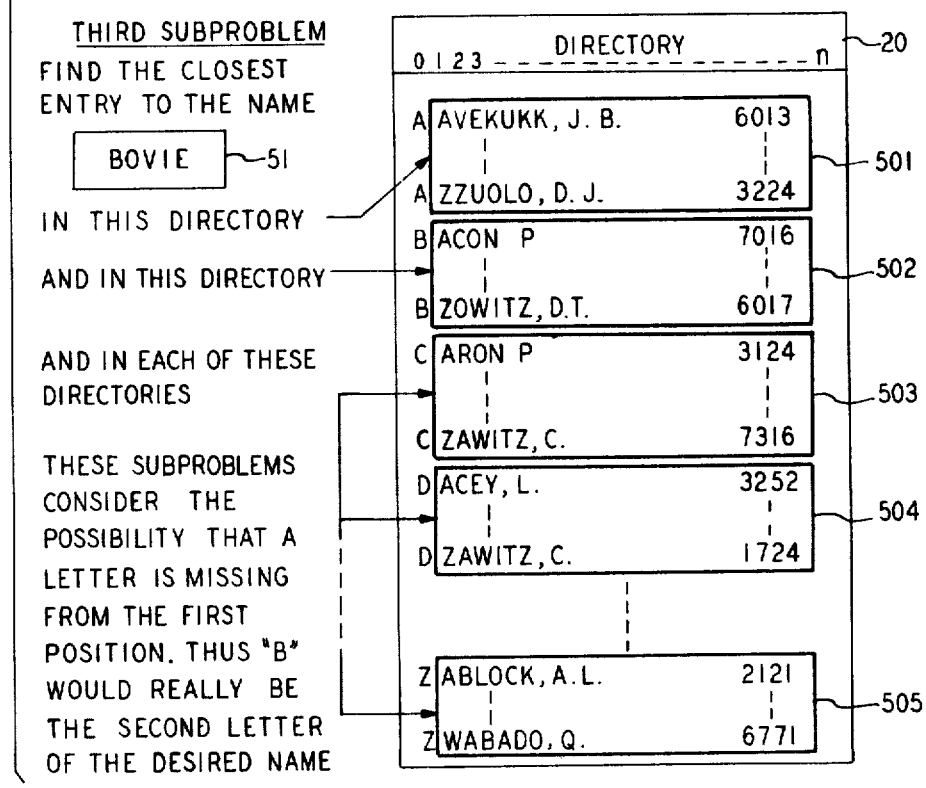

AT DISTANCE 1

NO OTHER POSSIBILITIES ARE CONSIDERED SINCE ANY OF THE OTHER POSSIBLE SUBPROBLEMS WOULD HAVE AT LEAST AS MANY ERRORS

DIRECTORY LOOKUP METHOD AND APPARATUS

BACKGROUND OF THE INVENTION

This invention relates to an arrangement for finding names in a directory in spite of spelling and typing errors.

Computer programs that look up names in a directory often require the provided name to be spelled correctly. In systems that tolerate errors, two basic techniques are used.

Some systems return all the names that are phonetically similar to the name requested by the user and force the user to search through a potentially bewildering array of possibilities. A user requesting a name like "bovie", for example, might be confronted with a list that includes names like "baffa", "bavier", "boffa", "boivie", "bova", "bove", "bovee", "bovey" and "bovie". This scheme puts much of the burden on the user who then must manually search a long list of possibilities to find the desired entry. This scheme also has another problem. If a user makes a nonphonetic error such as requesting "bowie" when the desired name is actually "boivie", the desired name would not even appear in the list of possibilities.

The second technique "corrects" errors by finding entires in the directory that are "close" to the name provided by the user. A directory entry is close to the requested name if it can be transformed into that name by a small number of insertions, deletions, substitutions and transpositions. The most common means of finding close names involves making small changes to the desired name and looking up the names that result from those small changes. This can take a great deal of computing time.

Because of the computation time required, practical implementations of the second technique put a bound on the number of errors that can be tolerated in a given word. Usually the bound is 1. Thus a user requesting "bove" would not be able to find a desired entry if the correct spelling of the name were "boivie".

SUMMARY OF THE INVENTION

I have solved the above problem by an arrangement which is based on the idea that the desired name is, in fact, already in the directory. If the name is not in the directory to begin with, then no matter what procedure is followed, it will not be retrievable. Thus, assuming that the desired name is in the directory, the directory itself can be used as a limiting factor on the possibilities that are examined.

This examination is accomplished by investigating three possibilities on a recursive basis, namely, (1) that the first character of the presented name may be correct, (2) that the first character may be an extraneous character which should be discarded, and (3) that a character should be inserted before the first character.

Each of the last two possibilities corresponds to an error in the input. As these three possibilities are recursively investigated, a count is kept of the cumulative number of errors that have been encountered. The algorithm does not consider possibilities in which the cumulative error count would be greater than that corresponding to a previously encountered "close name". The algorithm returns the name that most closely matches an input request. If this is not the name the user is looking for, the name that has been returned is effectively removed from the directory and the algorithm repeats the procedure to find the next closest name. The user can ask for any number of additional close names or specify a new request as desired.

BRIEF DESCRIPTION OF THE DRAWING

The solution to the foregoing problems, together with the operation and utilization of the present invention, will be more fully apparent from the following description taken in conjunction with the drawing, in which:

FIG. 4 shows how the problem of FIG. 2 is reduced if the first character of the input is assumed to be extraneous;

FIG. 5 shows how the problem of FIG. 2 is reduced if the input is assumed to be missing a character before its first character;

DETAILED DESCRIPTION

Figure 1:
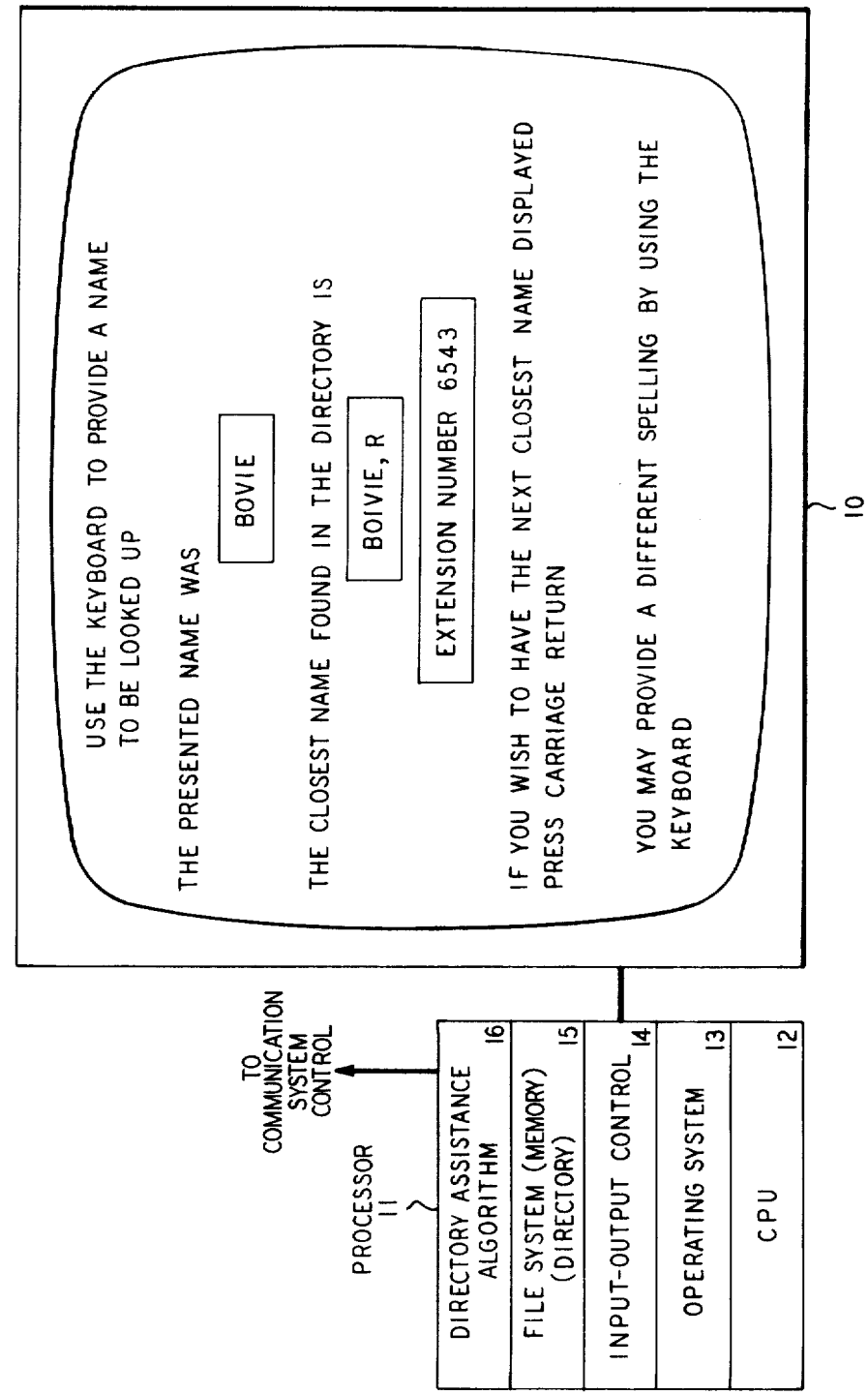
FIG. 1 shows an example of a display using my invention.

In FIG. 1, there is shown one use of my directory assistance system which uses an ordinary computer terminal for input and output. The desired name is presented via the keyboard (not shown) of device 10 to a directory assistance algorithm 16 running on processor 11 which processor may be, for example, a Digital Equipment Corporation VAX 11/780. Operating system 13, such as the UNIX (Trademark of Bell Laboratories) operating system, provides control of input and output 14 as well as access to files 15 which store the directory information. In systems in which the directory assistance algorithm is embedded in a larger application, such as in a text processing system providing spelling correction, the operating system would be used to provide access to other resources such as files corresponding to the documents to be processed. An operating system is not strictly necessary for my directory retrieval arrangement to work since the algorithm can be used with a memory resident directory. While the directory assistance algorithm is shown separately in FIG. 1, it is, of course, understood that the algorithm could be part of many other applications in which directory lookup is desired.

The directory assistance algorithm uses a binary search based strategy to find the name (or character string) in the directory that most closely matches the name requested by the user. Strings are "close" if one can be obtained from the other via a small number of "changes". The notion of closeness (or distance) will be discussed in detail hereinafter. For discussion purposes at this point, two strings are considered to be close if one can be transformed into the other by a small number of character insertions or deletions. The algorithm uses an alphabetically ordered directory and a recursive function called FIND to search that directory. FIND calls itself recursively in a number of places to build and search a problem solving tree. The algorithm does not actually build an explicit tree but by virtue of the recursion "builds" and searches an implicit tree. A pruning strategy is employed to avoid unnecessary searches. Thus, a subtree is not investigated if FIND determines that that subtree cannot possibly contain a better match than one already found.

Figure 6:
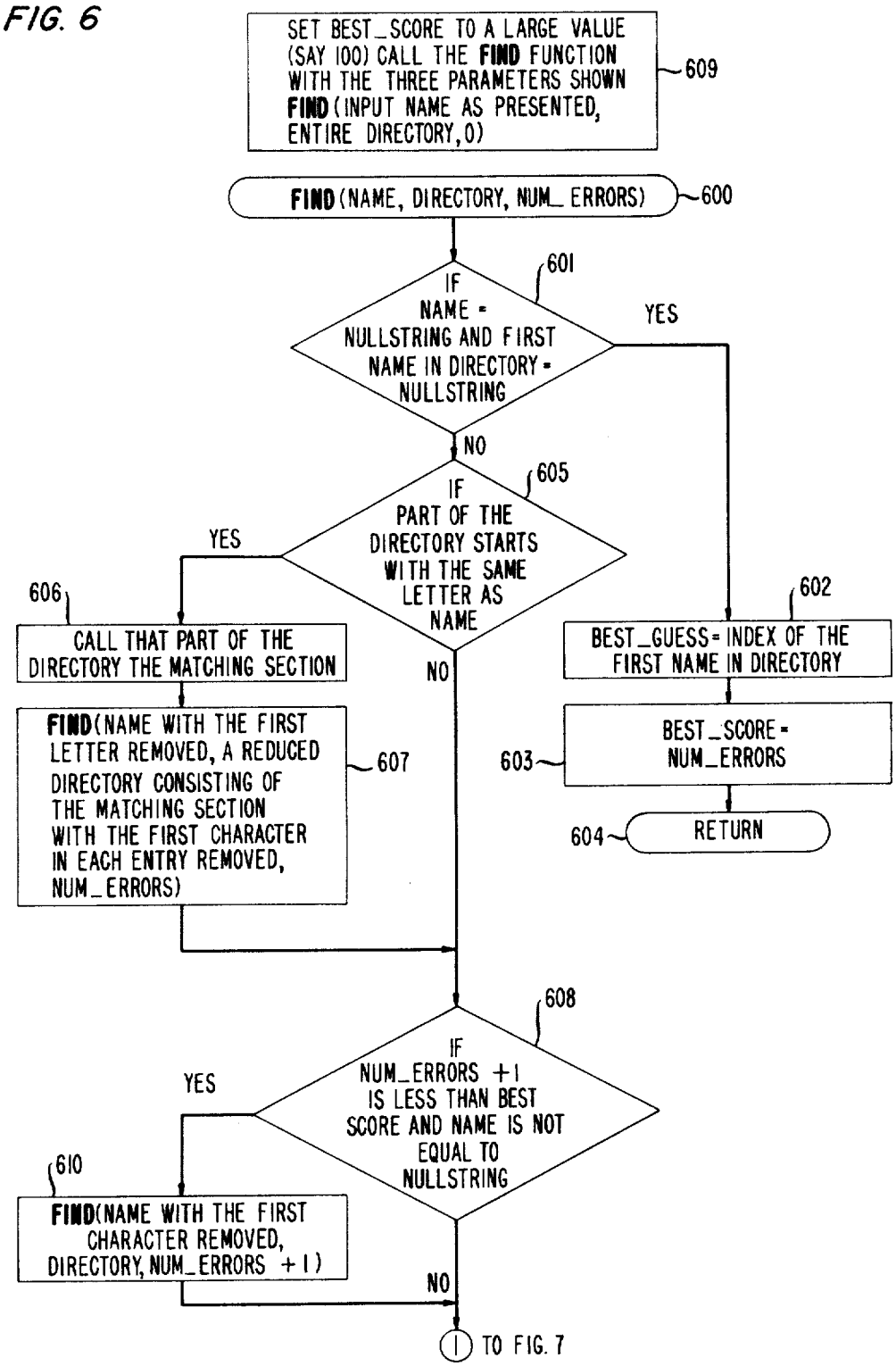
FIGS. 6 and 7 show the recursive algorithms which control the retrieval process.
Figure 7:
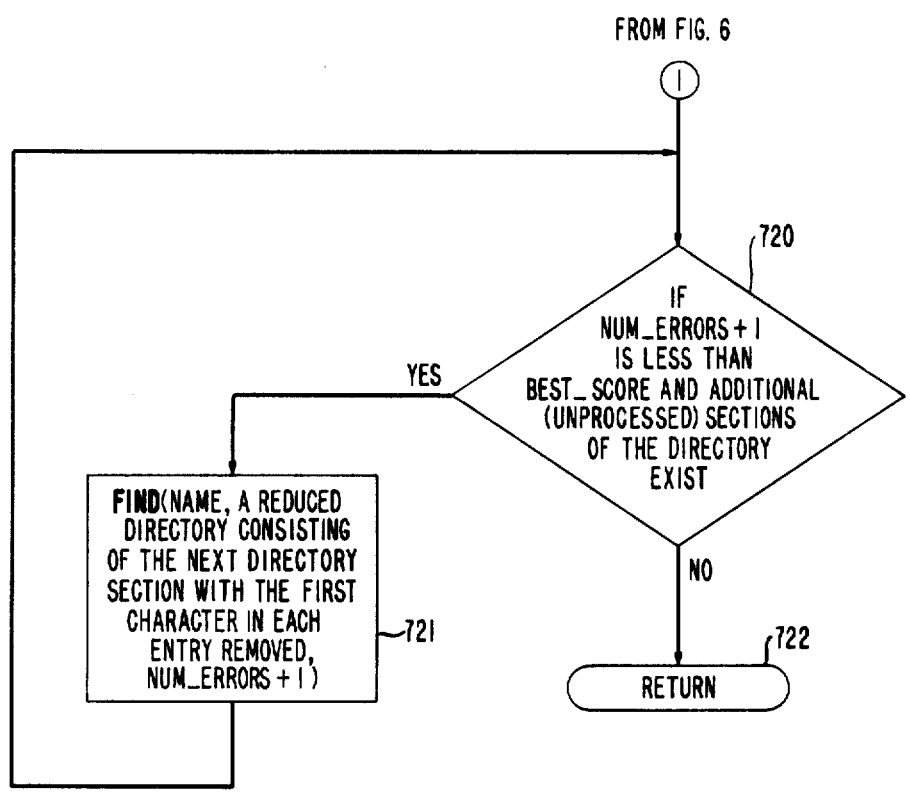

A simplified view of the process can be described as follows. A user makes a request and FIND (FIG. 6) is called. For simplicity, assume that the user types only the surname of the desired party. FIND is passed two arguments defining the first and last entries of the portion of the directory that is to be searched. Initially the closest match can be anywhere in the directory and FIND is passed the indices of the directory's first and last entries. Two other arguments specify the index of the next character to be "considered" in the input string and the next character to be considered in directory entries. These indices will be referred to as the input index and the directory index, respectively. Initially both of these indices are 0.

Figure 2:
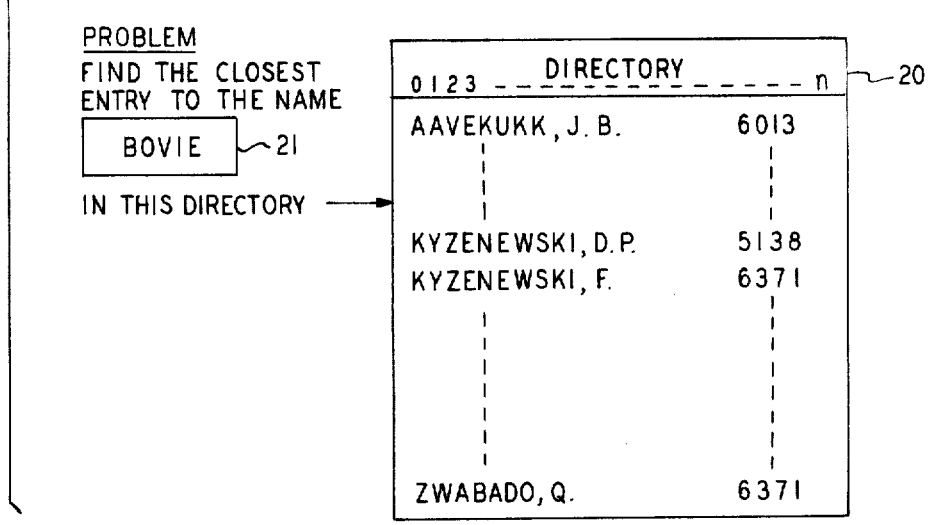
FIG. 2 shows an input request and a directory for a sample problem.

The example of finding "BOVIE" in a directory of names where the actual desired name is "BOIVIE" will be illustrated. FIG. 2 illustrates this problem where "BOVIE" is the requested name and the phone book is directory 20. Initially, the indices of the first and last entries refer to "AAVEKUKK" and "ZWABADO". These indices are determined by a knowledge of the directory. In FIG. 2, the input index is 0 indicating that the next character in the input string is the "B" in box 21. The directory index is also 0 indicating the left most column (0) in directory 20.

FIND considers these possibilities.

FIRST SUBPROBLEM:

The next character in the input string may be the next character in the name of the desired party.

SECOND SUBPROBLEM:

The next character in the input string may be an extraneous character that should be discarded.

THIRD SUBPROBLEM:

The input string may be missing a character (that appears in the name of the desired party) that should precede the next character in the input string.

Each of these possibilities is investigated by means of a recursive call to FIND.

Figure 3:
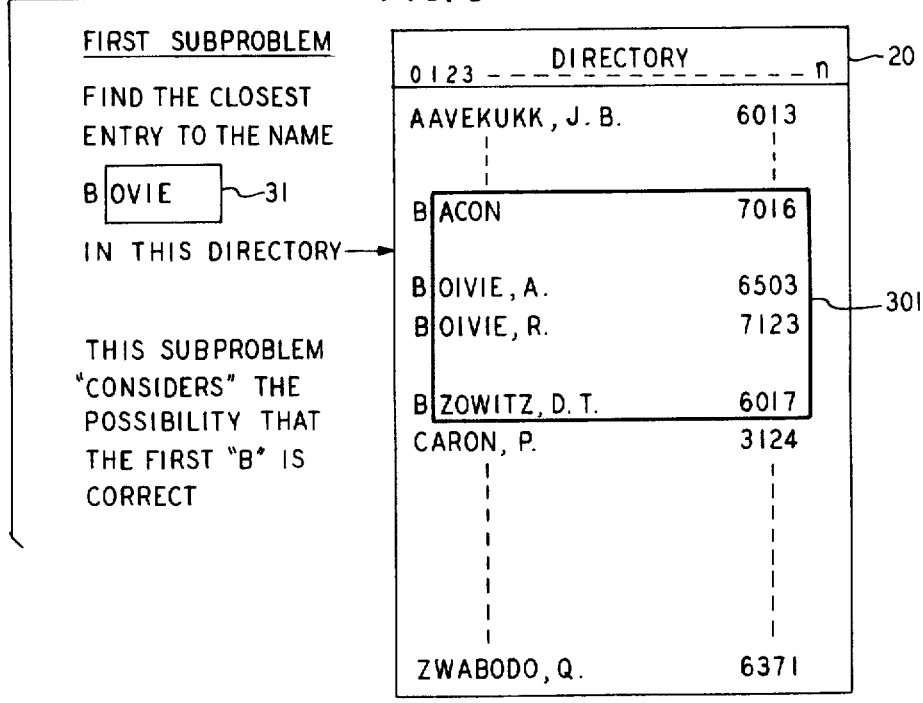
FIG. 3 shows how the problem of FIG. 2 is reduced if the first character of the input is assumed to be correct.

The first possibility is explored by calling the FIND function on "refined" directory 301 as shown in FIG. 3. The refined book consists of those entries of the current directory for which the character indexed by the directory index matches the character in the input string referenced by the input index. These entries are contiguous and their bounds are found with a binary search. In FIG. 3 the input index was zero referencing the "B" in BOVIE and the directory index was zero referencing the left most (0) column of directory 20. The portion of directory 20 in which the "B" matches the left-most (0) column extends from "BACON" to "BZOWITZ". These refined bounds are passed in the recursive call to FIND (FIG. 6) along with new values for the input and directory indices. The new values are 1 greater than the current values of these indices. Thus, the new input index points to the "O" in BOVIE and the new directory index points to column 1 of directory 20, which now becomes the left-most column of directory 301. Directory 301 is thus fully defined.

Based on the above arrangement, the problem of investigating the first possibility is reduced to the problem of finding a shorter "name" in a smaller directory, which in turn is further reduced to finding a shorter name in a smaller directory. Each such recursive call is a node of the search tree. The number of names in the smaller directory is less than equal to the number in the original and each name is shorter by one character. Recursive calls to FIND continually refine the indexes, continually reducing the size of the directory.

The second possibility in the analysis of FIG. 2 is shown in FIG. 4, namely that the next character in the input should be discarded. This possibility is considered in a recursive call to FIND in which the value passed for the input index is 1 greater than its current value and the values for the directory index and the directory bounds are passed unchanged. Thus, in FIG. 4, the input index, which was zero, is advanced to "1" and the directory index and the directory bounds from FIG. 2 remain unchanged. The fact that an input character had been skipped is also passed in the recursive call. This information is used to keep track of the cumulative number of "errors" that have been found in expanding the problem solving tree that is the number of times a character has been skipped on the path from the root to the current node. When FIND is initially called, this argument is 0. Whenever an input character is skipped, the argument is incremented.

The third possibility in the analysis of FIG. 2 is shown in FIG. 5, namely that the input is missing a character. This possibility is considered in another recursive call to FIND. In this call, the input index remains the same and the directory index is advanced. Since advancing the directory index, effectively removing the first character of the directory entries, produces an unordered directory, and since the directory must be alphabetically ordered to support the binary search mentioned earlier, in subsequent calls to FIND, the unordered directory is broken up into a number of ordered directories, each of which is processed by a separate recursive call to FIND. The ordered directories are obtained by partitioning the unordered directory such that the entries in each partition have the same character in the position indexed by the current (unadvanced) directory index. Each of these ordered directories is contiguous and the bounds between them are found via a binary search.

In FIG. 5, the ordered directories are shown as directories 501–505, with the bounds for each directory being based on the character in column 0 which has been eliminated. Now FIND is recursively called for each directory 501–505. By skipping the characters indexed by the unadvanced directory index FIND considers the possibility that each of these characters belongs in the input string at the position indexed by the input index. On the other hand, it does not consider the possibility that any other characters belong there. Thus FIND uses the information in the directory to avoid unnecessary searching. As in the exploration of the second possibility, the fact that a character has been skipped is passed by incrementing the cumulative error argument.

FIND continues to make these recursive calls and in so doing generates and explores a problem solving tree. The tree is explored in a depth first search which means that directory 501 (FIG. 5) would be completely analyzed before the analysis of directory 502 begins. Thus, the input and directory indices incremented will increase from 0 across the directory from left to right until the bottom of the tree is reached (as will be discussed hereinafter). In doing this, each directory, such as directory 501, is continuously broken into ordered directories of smaller and smaller size, each having its left-most character used to determined the next directory.

Search Technique

At each node of the search tree, the first possibility (first subproblem) is considered if the character referenced by the input index can be matched by a character referenced by the directory index. Complete consideration of this possibility may involve a number of other recursive calls at a number of other nodes in the subtree below the node in question. After the first possibility has been completely considered, or after that possibility has been ruled out (if the input character cannot be matched) the other two possibilities may also be examined. The second possibility (second subproblem) may be examined if the input index is not already at the end of the input string and the third possibility (third subproblem) may be considered if the directory index is not at the end of the directory strings.

Error String Determination

At some point, FIND will reach the bottom of the search tree. The input index will be at the end of the input string, the directory index will be at the end of some directory entry and one possible interpretation for the input string (namely the aforementioned directory entry) will have been found. At this point, the value of the cumulative error argument will be the number of characters that must be removed from the input string and from the directory entry to make the two strings conform. This value can also be viewed as the number of characters that must be added to or removed from the input string to produce the directory entry. In this simplified view of the search process, this value defines the distance between the two character strings.

Limiting The Search

After the distance (from the input string) to one directory entry has been found, FIND returns to the position of the last node and other possibilities are explored. In exploring these other possibilities, FIND uses the distance to this first entry to limit its search. FIND does not make a recursive call if the cumulative error argument would be greater than or equal to the distance from the input string to a previously found directory entry. Thus a subtree is not investigated if it cannot contain a better match than the best match already found. (One consequence of this pruning strategy is that correctly spelled names are found fairly quickly in a process much like ordinary binary search.) Whenever, FIND reaches the bottom of the tree, it updates the value of "the best distance found thus far". It also updates a reference to the appropriate directory entry. Initially the "best distance" is assigned some "large" value. After (the first invocation of) FIND completes its search, the reference will identify its best guess for the user's intended party.

The algorithm's best guess will always be a directory entry at minimal distance from the input string. If there are more than one of these entries, the algorithm will return the first of these it encounters in the course of its search. Pruning will prevent its pursuing any of the other possibilities. The depth-first nature of the search causes the algorithm to consider entries in which the first characters match those of the input before considering other entries. This means that characters near the beginning of the user's input are given slightly more weight than those near the end. Thus, for example, "pedersen" will be returned before "peterson" in response to a user request for "pederson".

Figure 16:
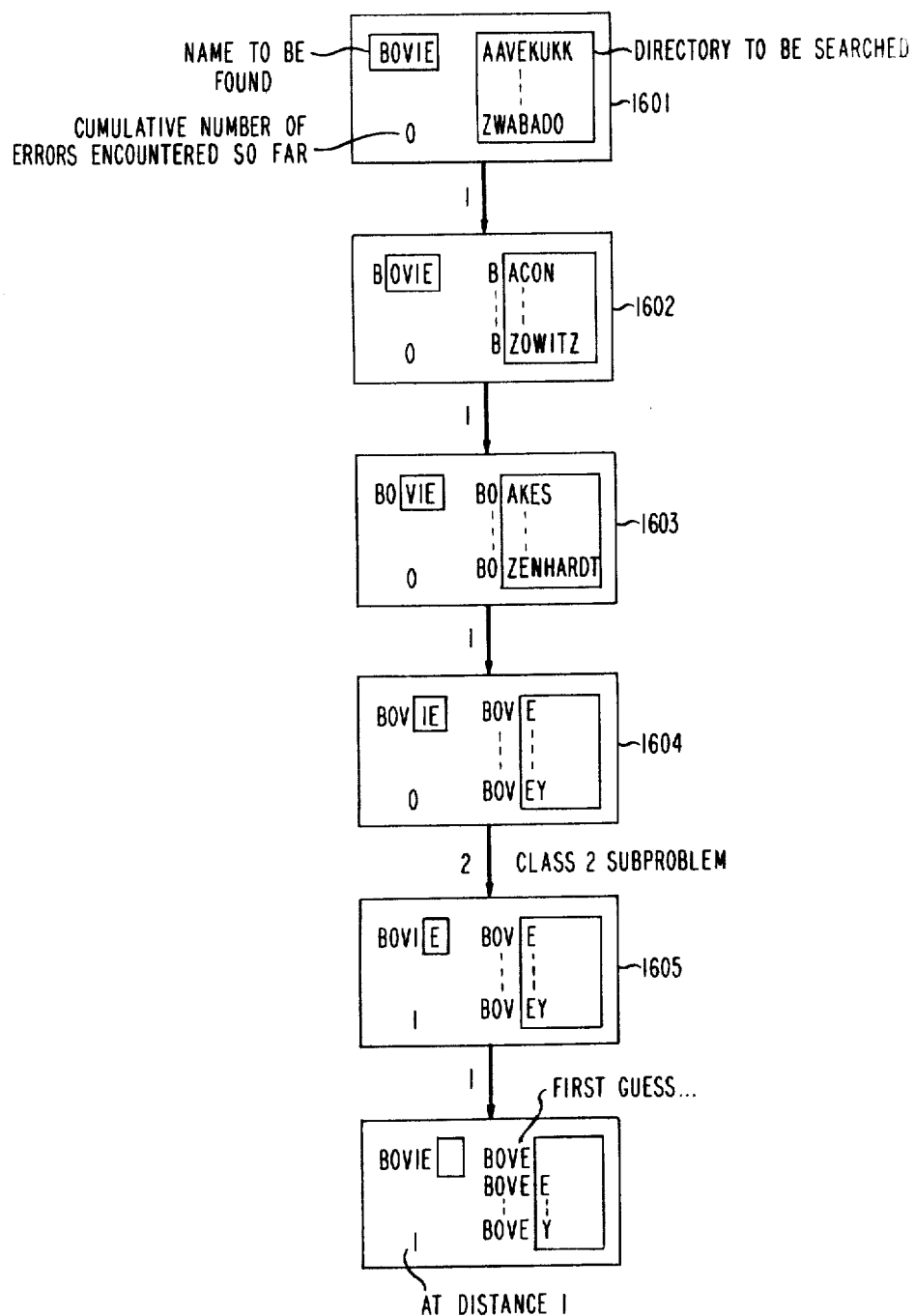
FIGS. 16 and 17 show a hypothetical problem solving tree.
Figure 17:
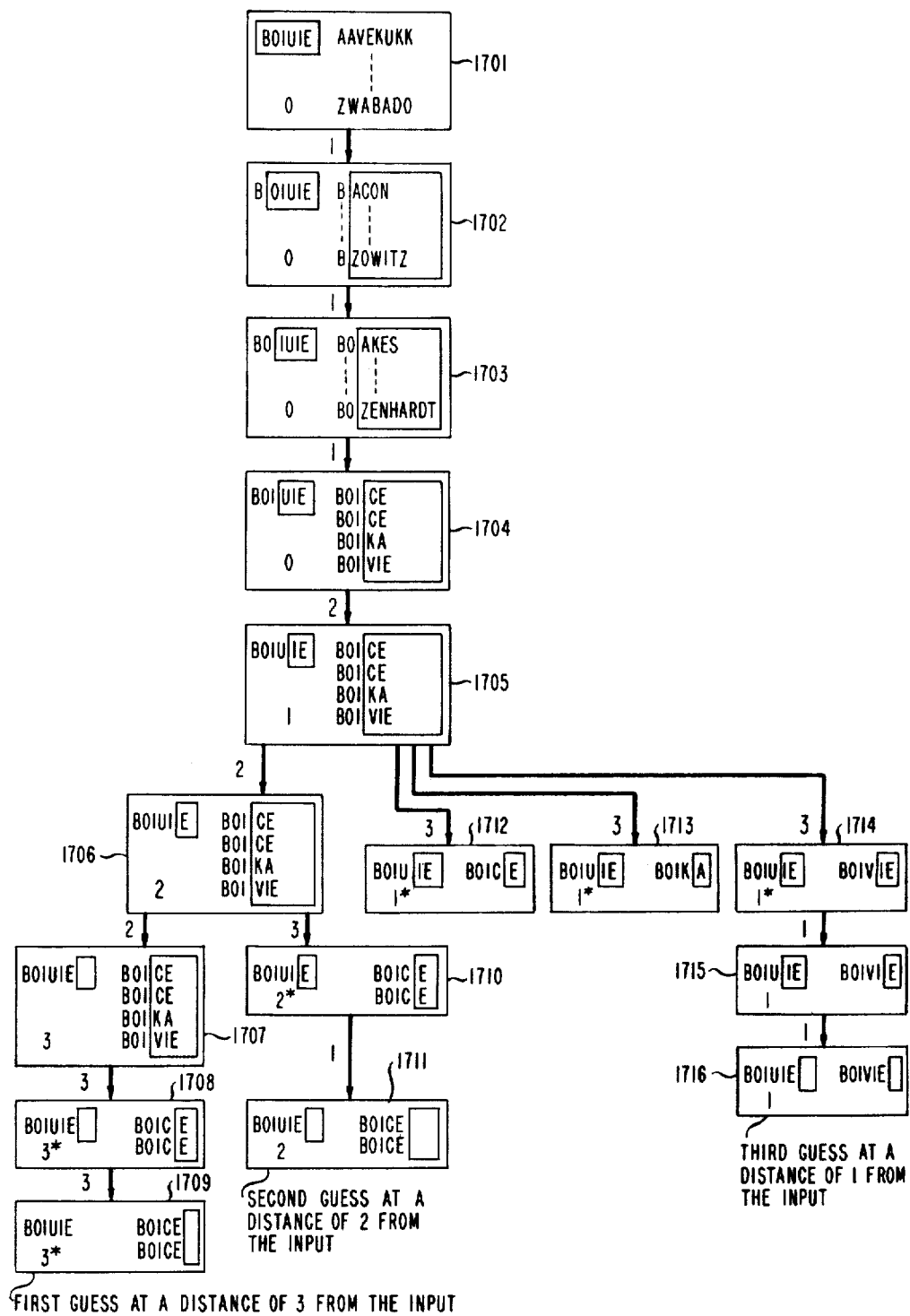

When the program returns an entry to the user, it also marks that entry. If the user asks for the next closest match, for example by operating the carriage return key on keyboard, FIND goes through the same process all over again, ignoring marked entries. Each additional entry that is returned is also marked. When a user provides a new name, the marks are removed before FIND is called. FIG. 16 illustrates a fairly simple problem solving tree. FIG. 17 shows a slightly more complicated one. The tree at FIG. 16 corresponds to the example discussed in connection with FIGS. 1-5.

In FIG. 16, node 1601 corresponds to the original problem. The name to be looked up (the input name) is "BOVIE" and the directory to be searched includes a large number of names from "AAVEKUKK" to "ZWABADO". The cumulative number of errors that have been encountered in expanding the tree to this point is 0. This problem is decomposed into the three kinds of subproblems that have been previously described. The first subproblem is shown in node 1602. This subproblem considers the possibility that the "B" in the input is correct, thus the problem is reduced to the problem of looking up the name "OVIE" in the reduced directory shown. The depth-first nature of the search means that the analysis of the other subproblems of 1601 will be deferred until the analysis of 1602 has been completed. The first subproblem in the analysis of 1602 is shown in 1603. Since the "O" is assumed correct, the problem has been reduced to looking up "VIE" in a reduced directory consisting of the names starting with "BO" with the "BO" removed.

Node 1603 is expanded to produce node 1604 in the same way. Now the problem is to find "IE" in a directory consisting of the names that start with "BOV" with the "BOV" removed. At this point, there is no name in the (reduced) directory that starts with the letter "I". Thus, this node does not have a subproblem of the first type and one of the other two kinds of subproblems must be investigated. The second kind of subproblem assumes the next character in the input is extraneous. This leads to the investigation of node 1605. Since an input character has been skipped, the cumulative number of errors is incremented (to 1). Node 1605 produces node 1606 since the "E" in the input can be matched by an "E" in the directory. Node 1606 is at the bottom of the tree. No more characters can be removed from the input or from the first name in the directory and thus the first name in the directory becomes the program's first possible guess for the name desired by the user. The first guess is not necessarily returned to the user. In general, other subproblems are investigated until it is determined that the remaining subproblems cannot produce a better guess than the best guess already found. Finally, the best guess or closest match is returned to the user.

After node 1606 has been investigated, control returns to node 1605. A complete analysis of node 1605 would produce other subproblems but since these other subproblems cannot produce a better guess (i.e., a closer match) than the first guess that has been found (since the cumulative number of errors is already 1 at node 1605)

these other subproblems are not investigated and control returns to node 1604. As at node 1605, the other subproblems of 1604 cannot lead to a better guess (since any of the other subproblems would also introduce an error) and control is passed to node 1603. From node 1603, control is passed to nodes 1602 and 1601 and no other subproblems are investigated. Thus "BOVE" is returned as the best match for "BOVIE".

The example shown in FIG. 17 is similar to that of FIG. 16 but a little more complicated. Nodes are expanded from 1701 to 1707 much as they were in FIG. 16. Node 1708 is produced from node 1707, and node 1709 is produced from node 1708 by skipping characters in the directory. Although characters were skipped in each of these steps the cumulative error total remains unchanged since the number of "recently skipped input characters" is greater than 0, as will be discussed hereinafter. After an initial guess is found in node 1709, control returns up the tree to node 1706 (since better guesses cannot be found by exploring any of the other subproblems of nodes 1707 or 1708). Node 1710 is produced by skipping a directory character but again since the number of recently skipped input characters is greater than 0, the skip of that input character is considered to be part of a substitutional error. Node 1711 is a second guess at a distance of 2 from the input. Since a guess at a distance of 2 has been found, control returns back up to node 1705 where other possibilities are explored. Nodes 1712, 1713 and 1714 correspond to the 3 subproblems of the third type that can be generated from node 1705. Node 1712 is investigated first but since the "i" in the input doesn't match the "e" in the directory, then any subproblems of 1712 would have at least 2 errors and are not explored.

Control returns to node 1705 and the second subproblem of the third type is generated. The analysis of node 1713 is the same as that of node 1712. When node 1714 is generated, the characters in the input match those of the directory and a better guess (at a distance of 1 from the input) is identified in node 1716. As control returns up the tree, no other subproblem is investigated since no other subproblem can produce a better guess than the best match already found (which is at a distance of 1 from the input).

Limiting the Search

The above discussion taken in conjunction with FIGS. 1-7, and 16-17, illustrates the principles of the invention. There are also several enhancements which a user may or may not wish to incorporate.

Figure 8:
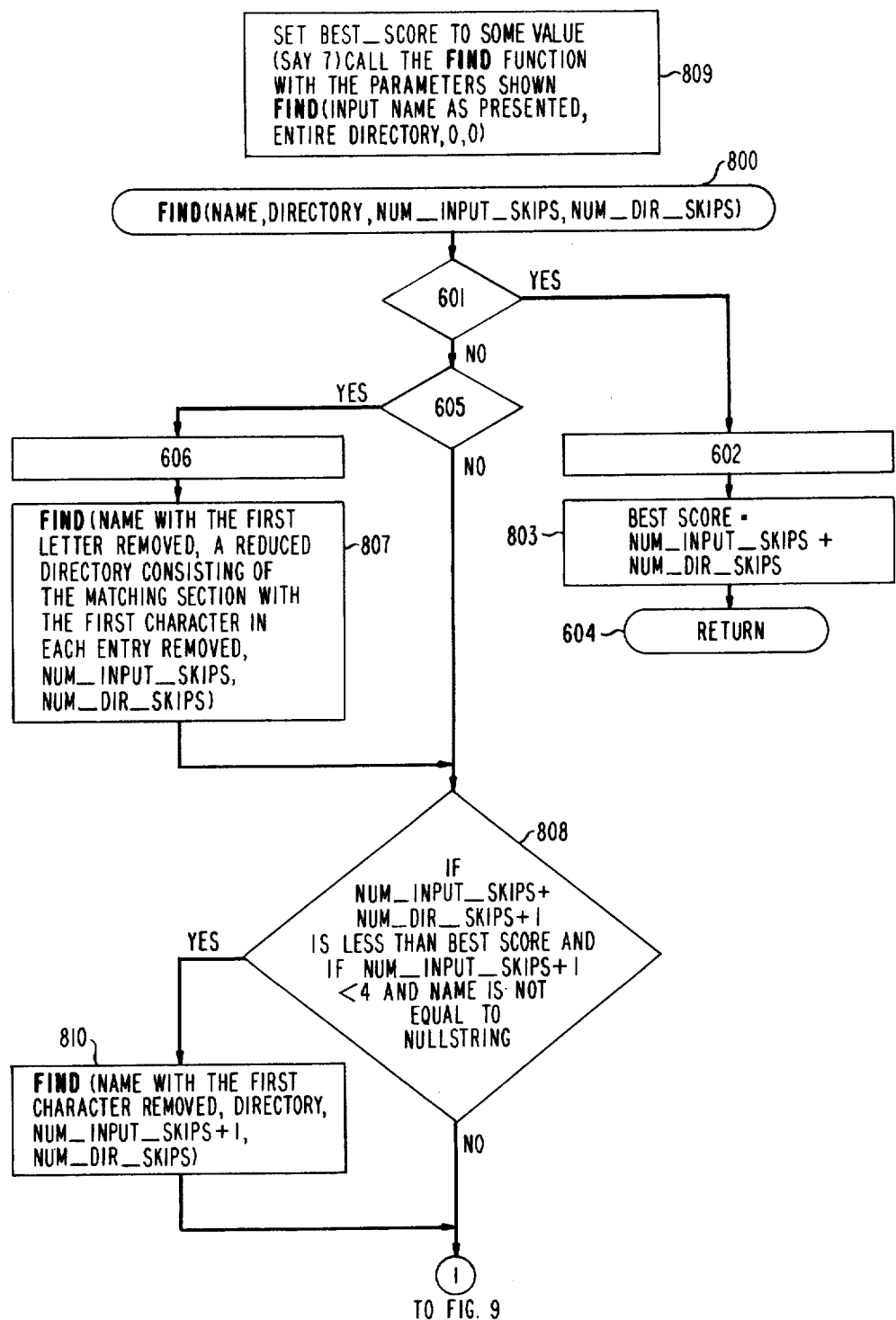
FIGS. 8-15 show improvements of the basic algorithm.
Figure 9:
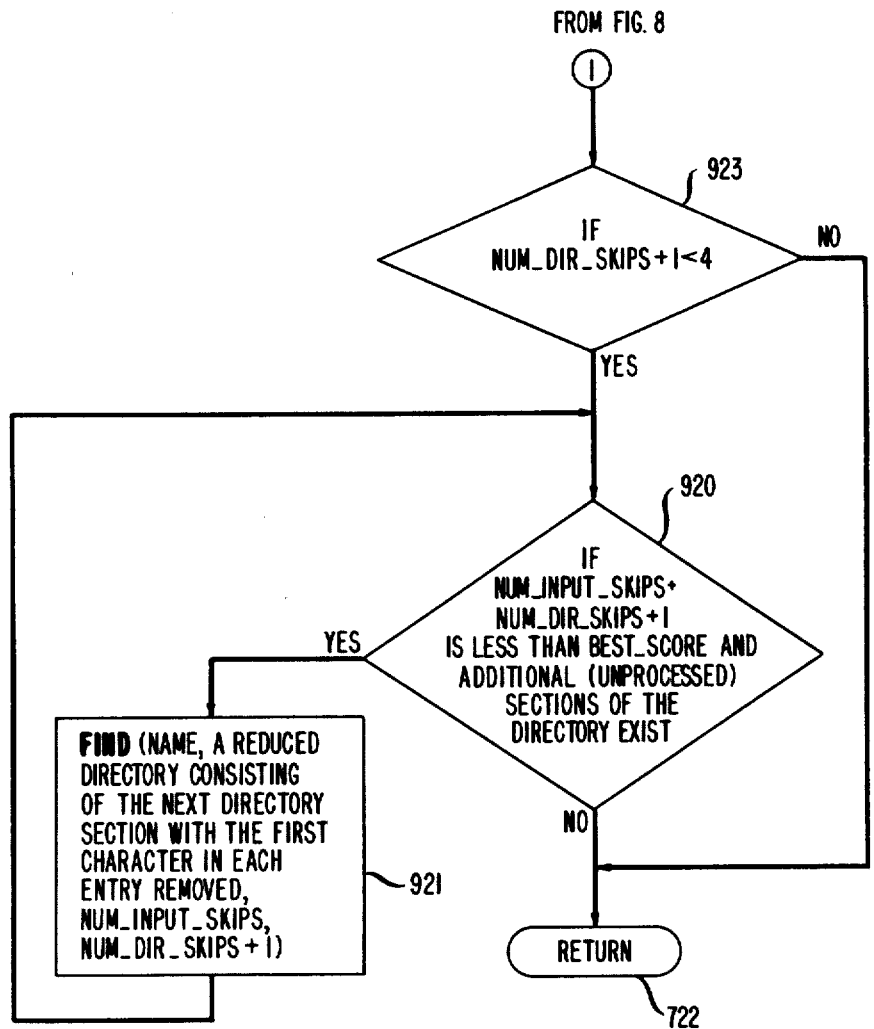

The simplest modification places a bound on the number of errors that will be tolerated. This allows the algorithm to do more pruning, particularly on its first few trips down the problem solving tree. The question that one must decide is whether or not it might be more appropriate to return a response (prompt) such as "?" or "what?" for a completely garbled input like "hwxyz", rather than returning a really strained "match" like "schwarz" which the unmodified version will do. At the same time, it is desirable to preserve the algorithm's ability to sort out reasonably muddled requests (like "dragutus" when the party's name is actually "grygutis"). A "maximum allowable distance" can be defined by changing the initial value of the "best distance found thus far" from a "large" value to a more moderate value (like 7). Thus, as shown in FIG. 8, box 809, BEST-SCORE is changed from 100 to 7.

Distributing Skips

A second modification eliminates some other unlikely matches. This optimization is based on the fact that an incorrect spelling of a name tends to be about as long as the correct spelling. An input request for "wunchen" could be a corrupted request for "wushing" but it's not likely to be an attempt to find "wu". This type of reasoning can be used to advantage by distributing the maximum number of characters that can be skipped (in comparing an input string to a phone book entry) to eliminate the possibility of all (or nearly all) of the skipped characters ending up in the same string. Instead of allowing as many as 6 skips (if the initial value of the "best distance" were defined to be 7) anywhere in either string, FIND might allow a maximum of 3 skips in the input string and 3 skips in a directory entry. FIG. 8 shows how FIG. 6 should be modified to provide this feature.

Redundancies

A third modification takes advantage of redundancies in the search. In certain situations, a node in the problem solving tree may be "visited" more than once. In fact sizable portions of the problem solving tree may be investigated and re-investigated several times. The problem can be illustrated as follows. Suppose a user makes a request for "tailor" when the name of his intended party is actually "taylor". For simplicity also assume that "taylor" is the only name in the directory starting with "ta". As FIND works down the implicit problem solving tree, it matches the "t"s and the "a"s and then compares the "i" in "tailor" to the "y" in "taylor". Since these characters do not match, FIND has 2 possibilities to consider. The first is explored in a recursive call in which the "i" is skipped and the second is explored in a recursive call in which the "y" is skipped. In the exploration of the first possibility, the possibility of discarding the "y" will be considered and in the exploration of the second possibility, the possibility of discarding the "i" will be examined. Thus, the case in which both the "i" and the "y" are discarded will be investigated twice. Since the exploration of the first subproblem finds a plausible interpretation of the input string at a distance of 2 from the input, FIND will not actually pursue the case in which both characters are thown out in its exploration of the second subproblem. This is so because it has already determined that it would be impossible to find a better match than one previously found. On the other hand, if there were other errors near the end of the input string, if the user had requested "tailer" for example, the algorithm could not prune so early and much of the analysis would be duplicated.

Figure 10:
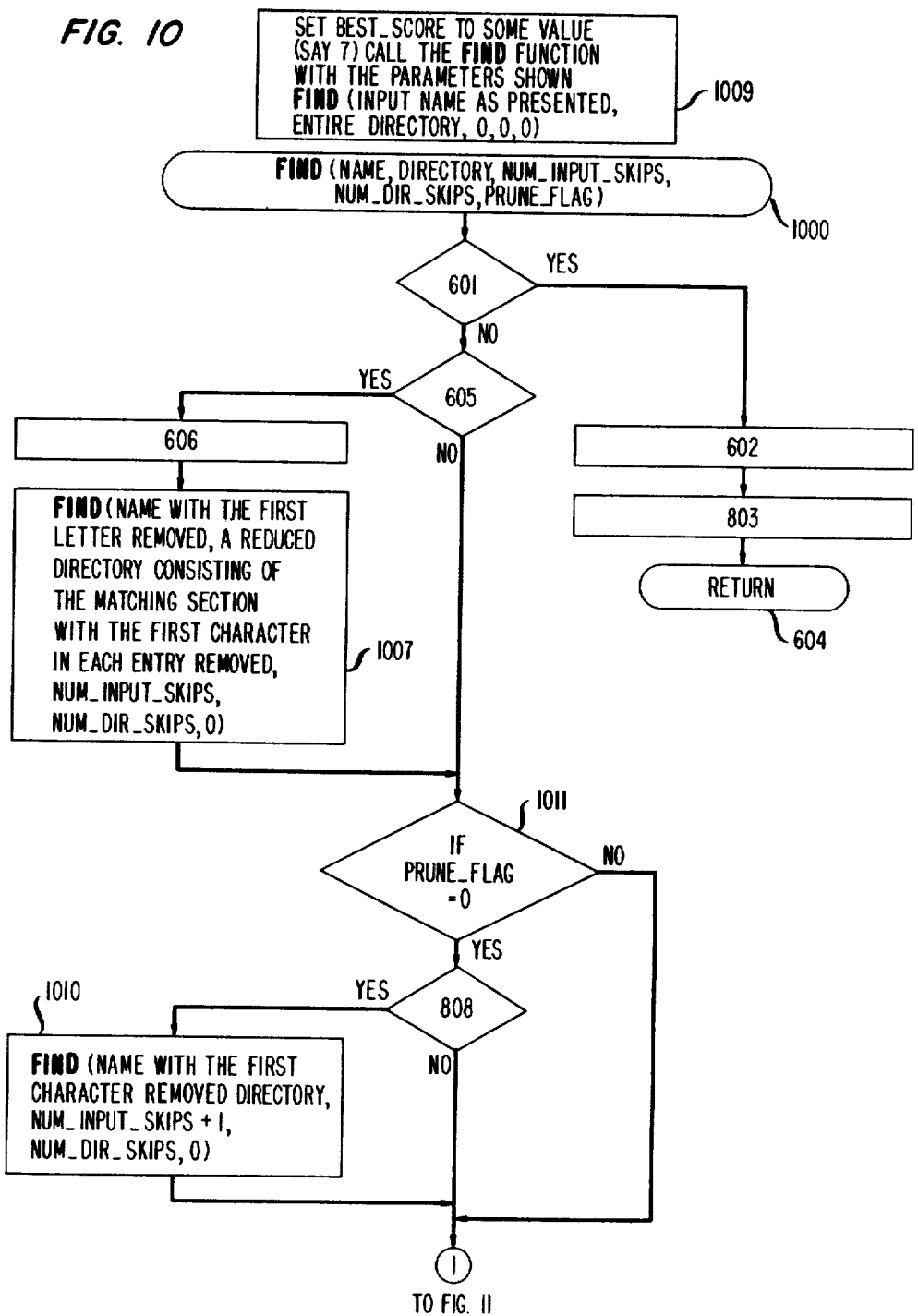
Figure 11:
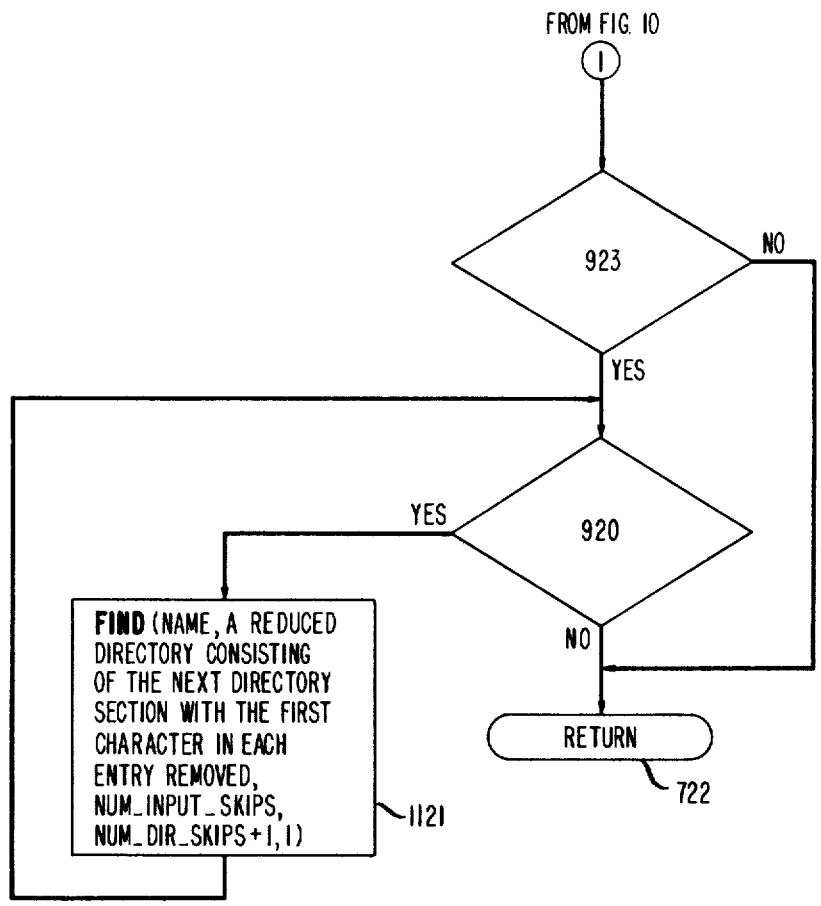

Other examples can cause the analysis of a single possibility to be repeated several times. In a comparison of "bowie" and "boivie", the "w" and the "iv" can be discarded in 3 different orders, namely, the 3 letters can be discarded in the order w-i-v, i-w-v, or i-v-w. Thus any possibility in which all 3 characters are discarded will be analyzed 3 times. In a comparison of "platik" and "pladek", the "ti" and the "de" can be discarded in 6 different ways. This means that some possibilities can be analyzed 6 times. FIND avoids this kind of duplicated effort by not making a recursive call in which an input character is skipped if the current call is the result of a skip of a directory character. FIG. 10 shows how the algorithm of FIG. 8 would be modified to incorporate this pruning technique.

Substitutions and Transpositions-General

Another change improves the quality of the algorithm's responses. Previously it was described how the algorithm is able to skip input characters and directory characters. This allows it to recognize errors of insertion and omission. Two other important classes of errors are errors of substitution (in which a correct character is replaced by an incorrect character) and transposition (in which two adjacent characters are transposed). Although these last 2 classes are not strictly necessary, since any misspelling can be viewed as a combination of insertions and omissions, the ability to recognize these classes is important since it improves the algorithm's ability to return the correct name. For example, if the prior definition of distance were used and a user requested "wiatt", the algorithm might return a guess of "witte" before "wyatt" (since both entries would be at the same distance from the input string and the leading characters of the former entry match the input string better than the leading characters of the latter entry). It might also return "wisst" before "weiss" for an input of "wiess". By broadening the definition of distance to include errors of substitution and transposition, the algorithm can recognize and return names (like "wyatt" and "weiss") that are only 1 substitutional or 1 transpositional error away from the input before names that require 2 insertions or omissions.

Substitutions

Figure 12:
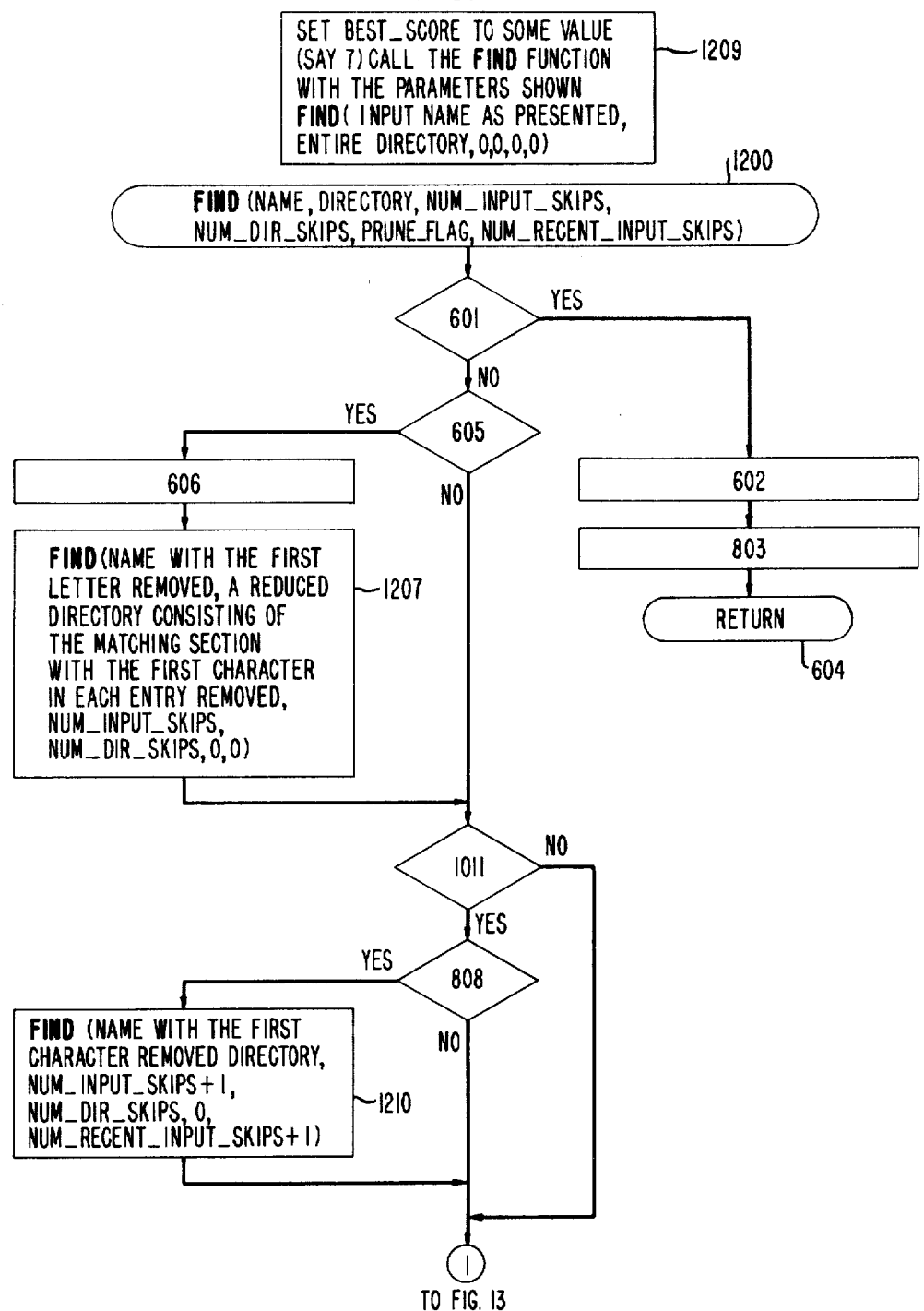
Figure 13:
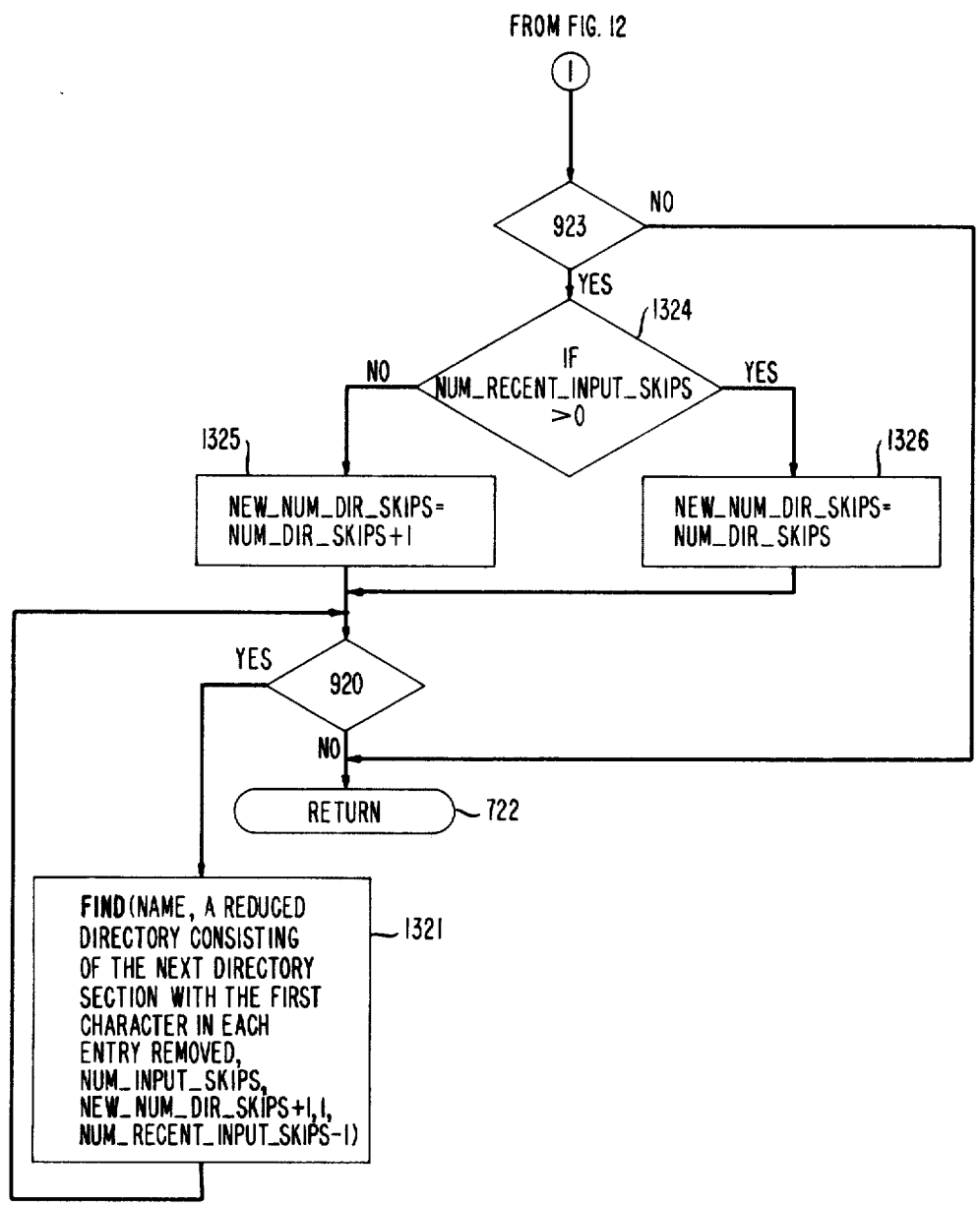

FIND recognizes substitional errors by using information passed in another argument. This argument keeps track of the number of "recently skipped" input characters that have not been paired off (in substitutions) with recently skipped directory characters. Initially the argument is 0. The argument is incremented in recursive calls in which an input character is skipped, decremented whenever a directory character is skipped, and set to 0 in recursive calls resulting from a match of an input character and a directory character. If the argument is greater than 0 when a directory character is to be skipped, the directory character and a previously skipped input character can be considered substitutions for each other. Thus both skips can be considered part of the same error. Since the number of errors was incremented when the input character was skipped, another error need not be tallied. If the argument is not greater than 0 when a directory character is to be skipped, an error is tallied in the usual manner. Since input skips never follow immediately after directory skips for reasons described above under "Redundancies", this procedure will recognize any substitutional error. The algorithm that includes the recognition of substitutional errors is shown in FIGS. 12 and 13.

Transpositions

A sequence consisting of an input skip, a match and a directory skip corresponds to a transposition if the skipped directory character is the same as the character skipped in the input string. This sequence is recognized through the use of another argument. This argument takes on one value whenever an input character is skipped, a second value when a match immediately follows an input skip and a third value in all other cases.

Figure 14:
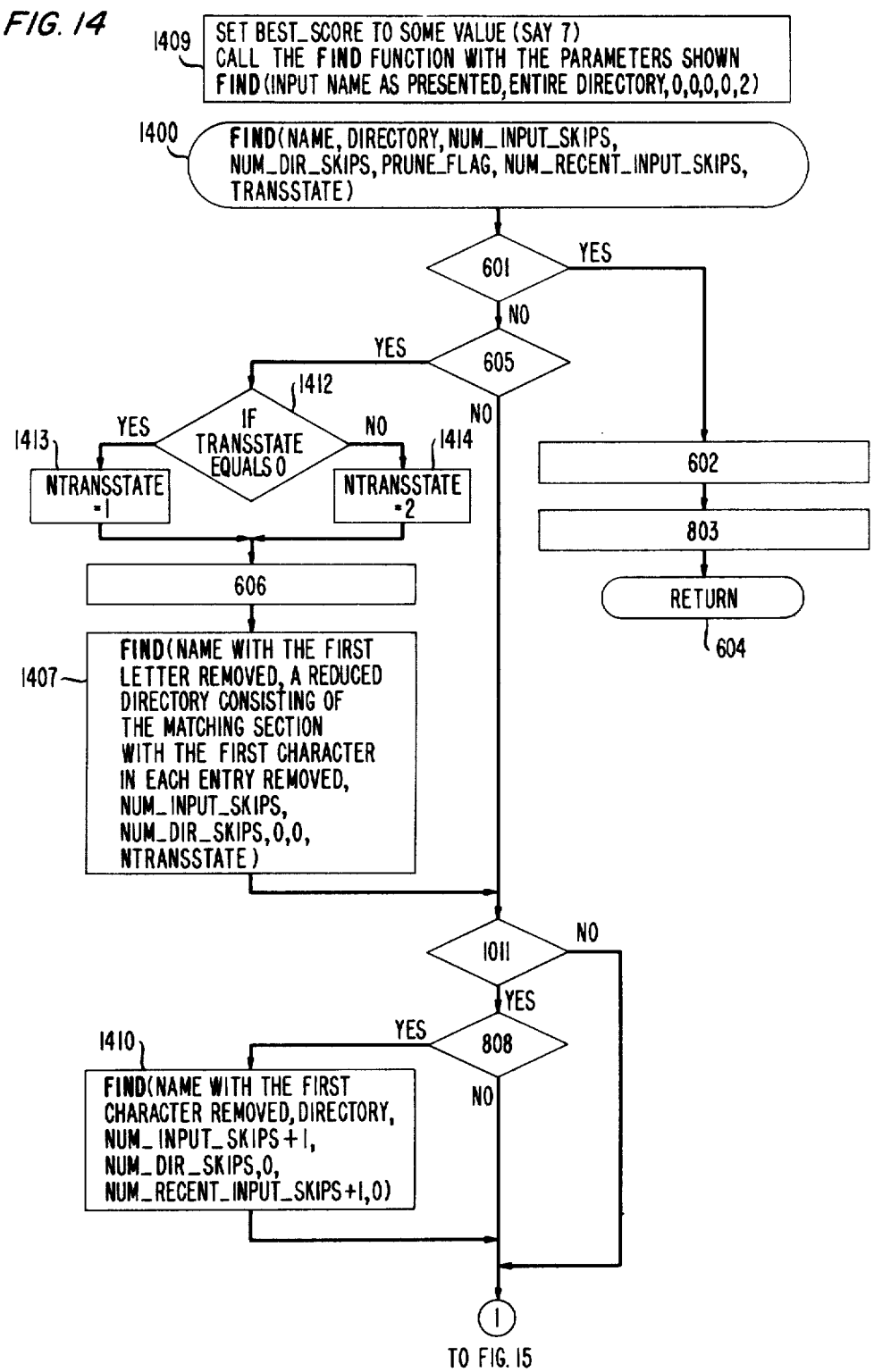
Figure 15:
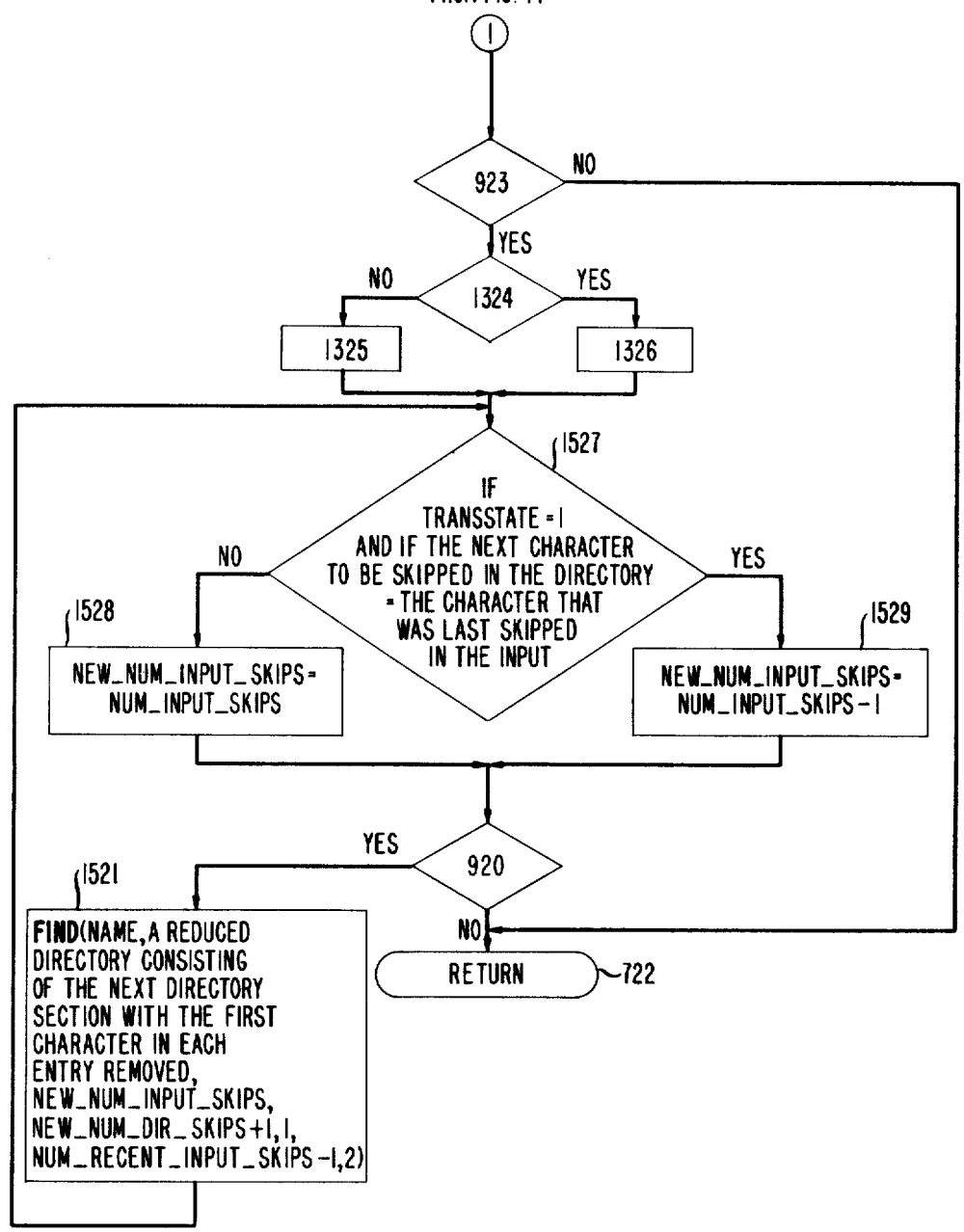

If the argument has the second value when a directory character is to be skipped, and if the directory character is the same as the character skipped in the input, the input string and the "current portion" of the directory differ by a transposition. As in the case of the substitution, the two skips are counted as a single error. Since any transposition can be described as an input skip, a match and a directory skip, it is not necessary to look for sequences of the form: directory skip, match, input skip. While either sequence could be used, the former is preferred since it finds the transposition earlier in the search. Note also that since the latter possibility will not be considered a transposition, but rather a pair of errors, it will not be investigated unless the complete exploration of the first possibility discovers at least two more errors following the transposition. FIGS. 14 and 15 show the algorithm that includes the recognition of transpositions.

Given Names

All but the smallest directory assistance applications need a means of dealing with given names. These names are important since large groups of people often share the same or very similar surnames.

A directory assistance program should be able to use given names to resolve ambiguities but it should not require the use of these names. If a user can unambiguously specify his party without a given name or if he doesn't know a particular given name, the algorithm should still be able to make a "reasonable" response.

Proper handling of given names requires more than just the inclusion of these names in the directory. Given a directory containing the following entries, for example, smith, b
smith, catherine
smith, gerald h
smits, jeffrey george and given a user request for "smits", the algorithm described in the last three sections would return "smith, b" as the closest approximation to the input string because the "jeffrey george" following "smits" would be considered a gross error.

This problem can be remedied by comparing surnames to surnames and given names to given names. The directory assistance algorithm does this by using FIND to compare surnames and another function, FINDGVN, to compare given names. Surnames in the directory end with a comma. Surnames in the user's input end with a comma, or with a newline if the user omits the given names. A preprocess replaces the first blank in the user's input with a comma if the input does not already contain a comma. Thus "boivie rick" is interpreted as "boivie, rick" and "van horne, ed" is interpreted as "van horne, ed".

Figure 18:
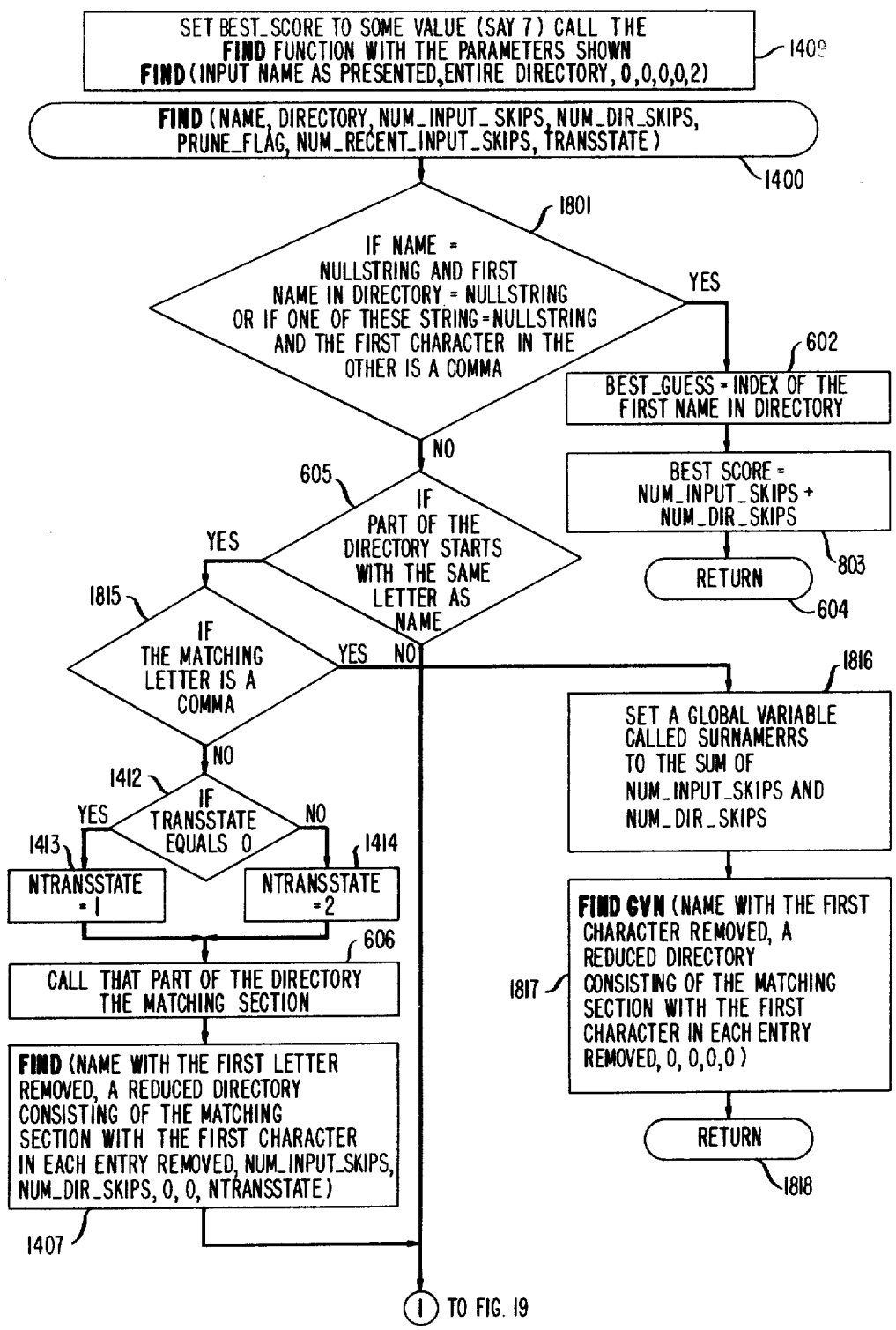
FIGS. 18-22 show enhancements that allow the algorithm to deal with given names.
Figure 19:
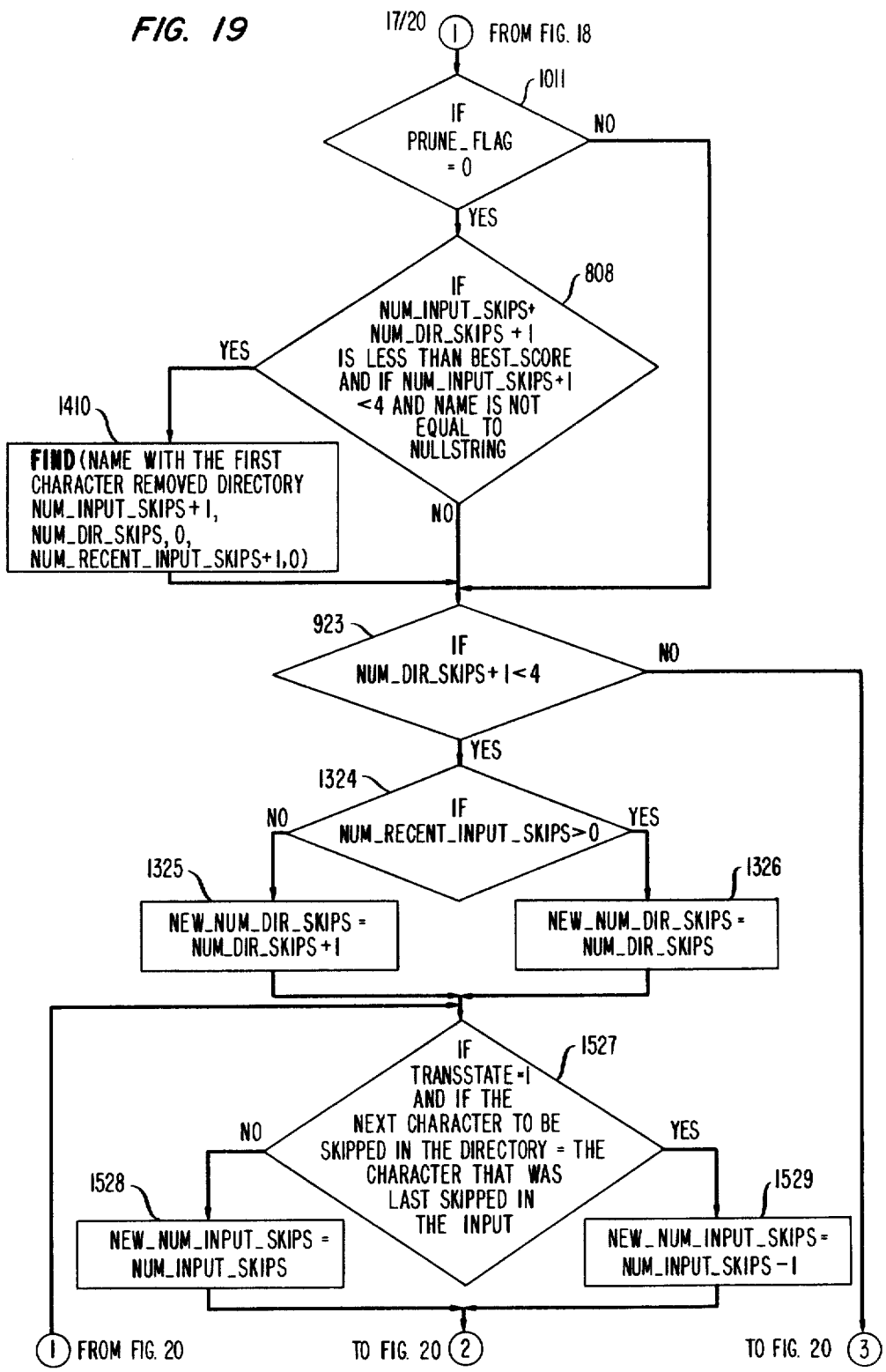
Figure 20:
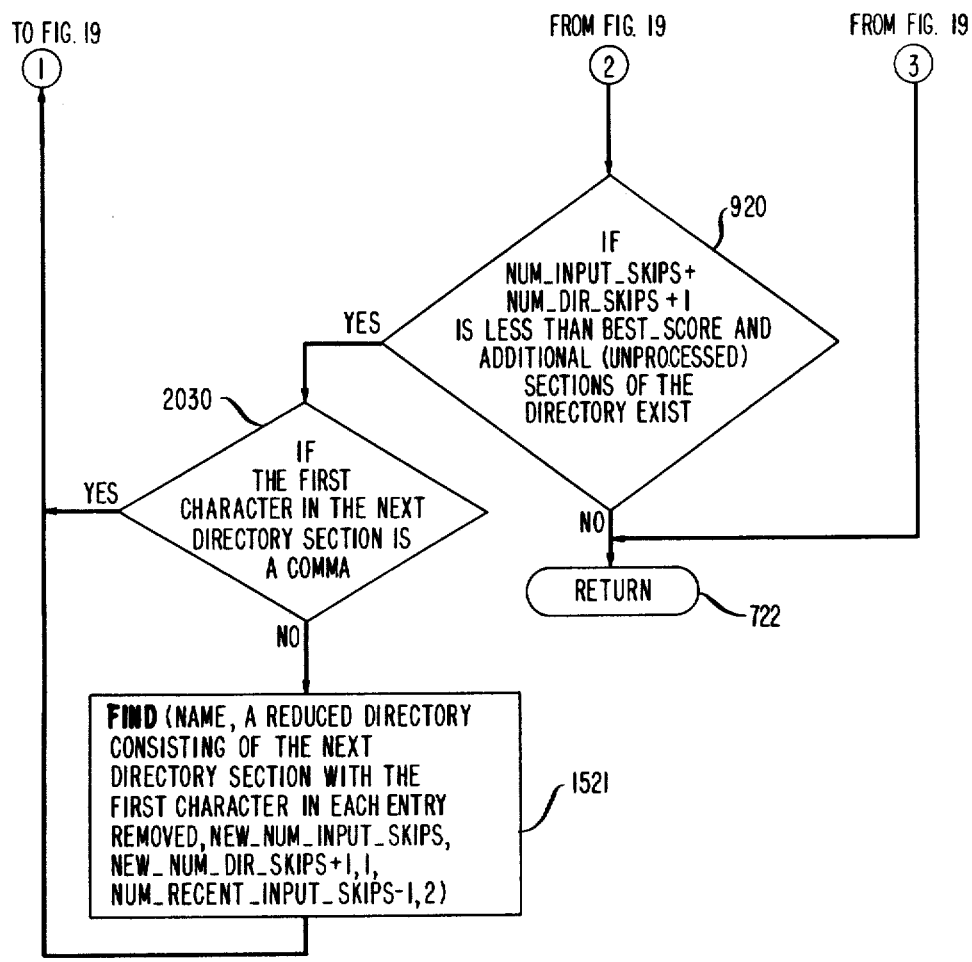

When FIND reaches the bottom of its tree (when the input and directory indices are at the end of surnames), FINDGVN may be called, as shown in FIG. 18. The complete flowchart for FIND including all the enhancements that have been described is shown in FIGS. 18–20. If the input includes given names, FINDGVN will build and search a problem solving tree rooted at a leaf of the tree built by FIND. This problem solving tree is much like FIND'S but errors are defined slightly differently. A flowchart for FINDGVN is given in FIG. 21, and the details will be described hereinafter. When FINDGVN reaches the bottom of its tree, the cumulative number of errors found by FIND and FINDGVN is used to define the "best distance found thus far". If given names are omitted, FINDGVN is not called and distances are based on the errors found by FIND. This strategy will insure that the "proper name" is returned when a user omits his party's given names even if the given names are fairly lengthy.

Given names present another problem. A user may use a given name when the desired directory entry lists only an initial. If the given name is long, the entry will seem far from the input string by the definition of distance discussed previously. An analogous problem results when a user only knows the initials of a party who is listed with first and middle names. These problems could be resolved by ignoring the non-initial characters in given names, but then the algorithm would not be able to distinguish between names like "james", "john", and "joseph" "smith". If this were the case, the program might return "smith, james" rather than "smith, joseph" for an input of "smith, joseph".

The algorithm defines the distance between given names in a way in which "contradictions" count as errors but "simple omissions" do not. The distance between two given names is based on the number of characters that must be removed from one name to make one of the names a subsequence of the other. (A subsequence of a name is a subset of its characters in which the order of the character is preserved.) This value can also be viewed as the number of characters that must be removed from one name to make one of the names an "abbreviation" of the other. If this value is used to define the distance between given names, the distance between "james" and "j" is 0, the distance between "j" and "john" is 0 and the distance between "james" and "john" is 3. This enables the program to recognize abbreviations while at the same time allowing it to differentiate different names. It also allows the program to recognize:

misspelled or mistyped names like "steven" for "stephen" or "ribert" for "robert", many nicknames like "rick" for "richard" or "tom" for "thomas", abbreviations that are often used in directories like "thos" for "thomas", "wm" for "william" or "jas" for "james".

Since by this definition, "richard" would be as close to "c" as it is to "r", the definition of distance that is actually used assigns extra weight to skipped initial characters. The distance between given names then is defined as the number of characters that must be removed from one name to make one of the names a subsequence of the other plus the number of initial characters that must be skipped to make 1 sequence of initials a leading substring of the other.

When FINDGVN calls itself recursively, the value it uses for the cumulative number of errors encountered is the sum of (a) the number of initial characters skipped plus (b) the smaller of the number of input characters skipped and the number of directory characters skipped.

When FINDGVN reaches the end of one string (either a directory entry or the input string), it updates the best error total and returns.

As in the case of FIND, FINDGVN does not make a recursive call if the value of this argument would be greater than a previously found "best distance".

Figure 21:
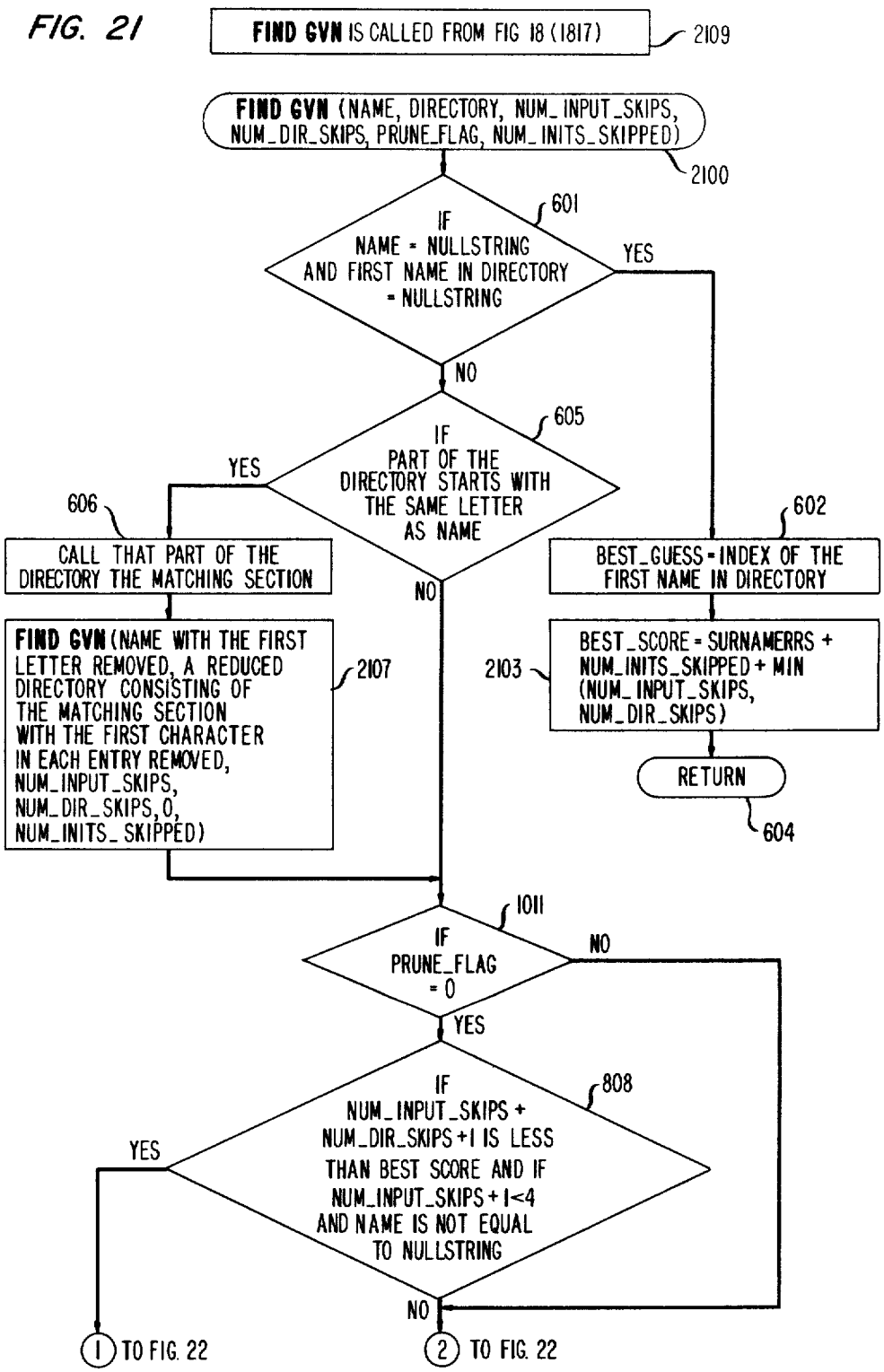
Figure 22:
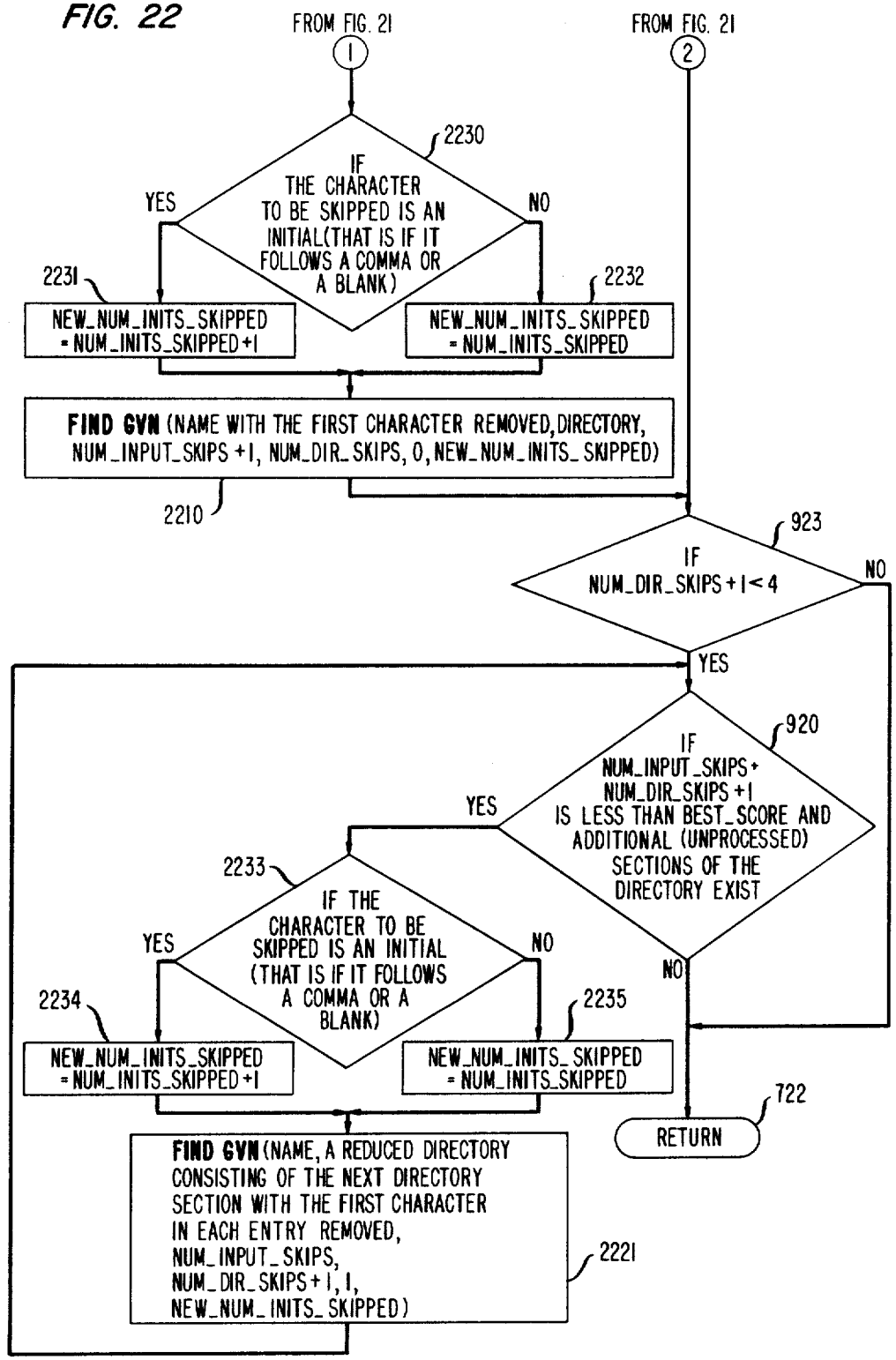

Since "smith, j" is a perfect match for "smith, james" (since the distance between the two names is 0), users can type names in either form without worrying about the form of a particular directory entry. This means that a user is never penalized for typing a correct given name. In fact it's to the user's advantage to type a given name (if it is known) even if the directory listing only includes initials. This is because the algorithm can use the given name to eliminate some other matches that would otherwise have to be considered. If a user types "smith, doug", the algorithm can rule out, for example, "smith, david" and "smith, donald" and concentrate on names like "smith, d", "smith, doug" and "smith, douglas". Similarly, if a user requests "mincosi, michael", the algorithm can weed out names like "mincoff, martin" and return better guesses (in the sense of fewer errors) like "mancusi m d". However, the use of an improper or nickname can sometimes be counter productive. For example "tommie" is far from "thomas" by the definition of distance that has been described. The algorithm for FINDGVN is shown in FIGS. 21-22.

Additional Pruning

Another enhancement provides additional pruning. The extra pruning does not speed up the process of making an initial response but it can speed up the processing of "secondary" guesses.

The extra pruning involves a circular stack to keep track of the scores of good guesses as the program winds its way through the problem solving tree. When the program finds a better guess that the best guess previously found, it stores the score for this best guess (as previously described) so that the search can be limited to the investigation of better possibilities. This value is also pushed into the circular stack. The circular stack is implemented with an array, like an ordinary stack, except that in the case of the circular stack, the stack pointer is incremented or decremented modulo the stack size. This has the effect of preserving the scores of the most recent "good guesses" in the stack even if the stack overflows.

After the program has come up with its best guess for a given input, the information in the circular stack is used to avoid unnecessary searching if the user requests (one or more) additional responses. If the stack is popped, and the score of the (already returned) best guess is removed, the value on the top of the stack will contain the score of the next best guess that the program has encountered. This value can be used to limit the search. Since the program can find an entry with a score at least as good as this value, it can safely rule out any poorer matches. The stack is maintained during the processing of each guess so that the search can be limited in this way for each additional response that the user may request. When a value is popped from the stack, a large value (i.e., a bad score) is stored in the popped location. This prevents the program from limiting the search prematurely if it pops its way around the circular stack to the same location a second time.

Extensions for Very Large Directories

A large directory requires a more "perceptive" algorithm than a small directory. In a large directory there are more names that are "close" to a given name than there are in a small directory. Thus it becomes increasingly important to discern slight differences in distance as the directory increases in size. In a large directory assistance application, phonetic information can be used to refine the notion of distance. Substitional errors in which a letter is replaced by a similar sounding letter (like "p" for "b" or "t" for "d") can be considered less significant than other substitutional errors. Similarly, insertional errors can be considered less serious if the inserted character follows a phonetically similar character. This might allow the algorithm to find "ritacco" for an input of "rittaco" before "rittolo", "rittzac" or "ribbaco" for example.

The algorithm can also be made faster. Experience has shown however, that the program is already fast enough to handle directories on the order of several tens of thousands of names as long as there is a sufficient amount of memory available.

The simplest way of expanding the capacity of the algorithm is to run it on a machine that has more than 16 bits of addressing and expand the buffer that is used for the directory sections beyond 64K bytes.

Since the time required to read portions of the directory into memory is a significant part of the total time, contiguous files (or at least larger blocks) can be used to improve the overall performance by reducing the time required to bring a directory section into memory.

Directory sections that are too large for memory can be paged into memory, one page at a time. The algorithm might examine the most promising page (the one that would contain the input string if the input string were spelled correctly) first and then examine the other pages to try and find a better match. This strategy would produce the greatest degree of pruning on average.

If directory sections are paged, asynchronous I/O and double buffering could be used to reduce the amount of time the algorithm would spend waiting for I/O.

Directory sections can be made smaller by using more information from the beginning of a name in defining the sections. To decrease the chances of missing a character because of a spelling error, the sections could be defined on the basis of phonetic equivalence classes or some other fault-tolerant "hashing" mechanism. A search strategy based on B-trees might also be employed.

Data compression might produce a large payoff. A scheme involving variable length names, compression of leading substrings that are shared by adjacent entries and Huffman encoding could allow a lot more names to be packed into a section of memory.

In dedicated directory assistance applications, the directory can be stored in a large read-only segment that would be shared among a number of directory assistance operators (and a number of directory assistance processes). This would allow the cost of the memory to be shared by a number of users.

If the CPU becomes the bottleneck (if the cost of memory plummets), multiprocessing can be used to advantage. Directory sections can be divided into smaller subsections and the various subsections can be investigated in parallel.

Conclusions

The concepts and systems described herein can provide a very forgiving directory assistance service to users of a communications system. The algorithm that has been described enables a user to find a desired party in spite of spelling errors and typing errors. The algorithm "corrects" errors by finding the name in the directory that most closely resembles the name requested by the user.

The algorithm uses all the information submitted by a user. It preserves the distinction between different characters as it corrects errors. It does not consider different characters to be equivalent and does not substitute one character for another unless that replacement is necessary to correct the input. This tends to produce less false drops than, for example, spelling correction schemes in which all "t"s and "d"s are considered equivalent. It can also handle any kind of spelling or typing error, whereas some systems can only deal with spelling errors in which the sound of a word is preserved. It can also handle several errors within a single word.

The algorithm is of course universal since it does not require a predefined set of likely misspellings but rather finds words from a directory of defined words that are close to a given word by a general set of rules.

The algorithm can be used in a variety of applications ranging from problems of organic chemistry that require the recognition of similarities between molecules to text processing systems. In a text processing system, a program that detects spelling errors, such as that discussed by Kernighan, Lesk and Osanna in the *Bell System Technical Journal*, Vol. 57, No. 6, part 2, July-August, 1978, which is hereby incorporated by reference, might scan a document looking for spelling errors. When errors are detected, the lookup algorithm could be used to suggest correct spellings which could be substituted as the user desires. Alternatively, the text processing system could automatically correct the spelling errors in a document and also provide a list of the changes made. This would allow a user to verify that the changes made sense in a given application since some applications require words that are non-standard. Of course the directory or dictionary can be defined to contain any words the user deems appropriate.

The directory look-up arrangement could also be imbedded in a telephone system or an electronic mail system. In this case, after the program has helped a user identify his or her desired party, information from the directory could be used by the system itself to place a phone call or to send an electronic mail message. In this kind of application, the phone number or the mailbox would not even have to be provided to the user.

What is claimed is:

1. A directory lookup method comprising the steps of subdividing a given directory of character strings into at least one subdirectory of character strings having bounds defined by a character of a presented character string, and examining said subdirectory for matches between a particular character of said presented character string and a particular character of said subdirectory character string.

2. The invention set forth in claim 1 wherein said subdividing and said examining steps are performed recursively by changing either said presented word character or said directory character.

3. The invention set forth in claim 2 further comprising the step of identifying directory strings of characters where matches occur.

4. The invention set forth in claim 3 wherein said method further includes the step of utilizing said identified character strings one string at a time dependent upon the number of mismatched characters between said directory character string and said presented character string.

5. The invention set forth in claim 3 wherein said method further comprises the step of
performing said subdividing and said examining steps individually on separate portions of said presented character string.

6. The invention set forth in claim 5 wherein said arrangement further includes the steps of
calculating an error number for each said identified character string,
utilizing said identified character strings one string at a time in an order determined by said calculated error number.

7. The invention set forth in claim 6 wherein said error number is calculated separately for each said separate portion of said presented character string, and
wherein said determined order of utilizing said matched character strings is established jointly by said error number calculations of each said portion of said presented character string.

8. The invention set forth in claim 7 wherein said error number calculation is made using different criteria for each said presented character string portion.

9. The invention set forth in claim 8 wherein the criterion for calculating said error number for a first portion of each said identified character string is the number of mismatched characters between said directory character string and said presented character string, and
wherein the criterion for calculating said error number for a second portion of each said identified character string is based on the number of characters that must be removed from one string to make it an abbreviation of the other.

10. The invention set forth in claim 9 wherein said second portion error calculating criterion is further defined as
the number of initial characters skipped plus
the smaller of the number of input characters skipped and the number of directory characters skipped.

11. The invention set forth in claim 3 wherein said identifying step includes the step of terminating said subdividing and said examining step when a preset number of character mismatches occur.

12. The invention set forth in claim 11 wherein said terminating step includes the distribution of character mismatches between said presented character string and said directory character string.

13. The invention set forth in claim 3 wherein said identifying step includes the step of limiting said subdividing and examining steps as a result of identified character string matches.

14. A method of providing directory look up, said method comprising the steps of
continually subdividing a given directory into a subdirectory of character strings having bounds defined by certain characters of a presented name,
recursively examining said subdirectory character strings for matches between a certain presented name character and a certain subdirectory character, said examination to cease when the last character of the presented name characters has been examined and when the first character string in the subdirectory is zero,
calculating an error number for each subdirectory string of characters where matches occur, and
sequentially providing indications of the subdirectory names having error numbers lower than a preestablished number.

15. The invention set forth in claim 14 wherein the sequence is controlled by said error number calculation.

16. The invention set forth in claim 14 wherein the examination of a subdirectory stops when a preset error number is calculated.

17. The invention set forth in claim 15 wherein said subdividing step is directed by said calculated error number.

18. The method of identifying from a directory of character strings a particular one of said character strings that most closely matches an input character string, said method comprising the steps of
recursively defining the limits of a directory that is to be searched, and
recursively defining a character index in each said defined directory and a character index of said input character string and comparing said defined characters for mismatches.

19. The invention set forth in claim 18 further comprises the steps of
generating from said recursive steps a string of directory characters having the lowest number of mismatched characters.

20. The invention set forth in claim 18 wherein said recursive steps are arranged to divide the problem of finding the character string in said directory that most closely resembles said input character string into classes of subproblems based on the following assumptions:
(a) that the next character in said input string is actually the next character in said input string,
(b) that the next character in said input strings is an extraneous character, and
(c) that the input string may be missing a character that should preceed the next character in said input string.

21. The invention set forth in claim 19 wherein said input character string and said directory of character strings are divided into parts, and wherein said recursive steps are performed individually, on each said part of said input string.

22. The invention set forth in claim 21 wherein said generated mismatched character string is dependent upon mismatches in both of said parts.

23. The invention set forth in claim 22 wherein the criteria for mismatches between said input string of characters and said directory string of characters is different for each said part.

24. The invention set forth in claim 18 further comprising the steps of
calculating the mismatch distance, in terms of character mismatches, between a currently defined character index and other possible character indexes subservient to said index, and
limiting said recursive steps when it is determined that further recursions can only result in increased mismatched distances.

25. The invention set forth in claim 19 wherein said generating step includes the step of terminating said recursion when a particular number of character mismatches occur.

26. The invention set forth in claim 25 wherein said terminating step includes distributing mismatches caused by missing characters in either the input string or directory string between each said string.

27. The invention set forth in claim 25 wherein said terminating step includes tracking substitutional errors between said input and directory strings.

28. The invention set forth in claim 25 wherein said terminating step includes tracking transpositional errors between said input and directory strings.

29. The invention set forth in claim 18 further comprising the step of modifying said character indexes dependent upon said compared character strings.

30. In a text editing system an arrangement for controlling spelling errors in said text, said arrangement comprising
    means for identifying words in said text which are misspelled,
    means for comparing each said identified misspelled word with a dictionary of correctly spelled words, and
    means cooperating with said comparing means for presenting a word from said dictionary corresponding to the closest match between said misspelled word and a word in said dictionary.

31. The invention set forth in claim 30 further comprising
    means for substituting in said text each said presented word for the corresponding misspelled word.

32. The invention set forth in claim 30 wherein said closest match is defined as the word in said dictionary requiring the smallest number of modifications to be transformed into said misspelled word.

33. The invention set forth in claim 30 wherein said dictionary of words includes strings of characters and said misspelled word is a string of characters, and wherein said comparing means includes
    means for subdividing each said dictionary of character strings into at least subdirectory of character strings having bounds defined by a character of each said misspelled character string, and
    means for examining said subdictionary for mismatches between a particular character of said misspelled character string and a particular character of each said subdictionary character string.

34. The invention set forth in claim 33 wherein said subdividing and said examining means are recursively enabled by changing either the misspelled word character or the dictionary character.

35. The invention set forth in claim 30 wherein said comparing means includes means for identifying strings of characters having low mismatches.

36. The invention set forth in claim 35 wherein said comparing means includes means for terminating the analysis of a particular line of investigation when a preset number of character mismatches occur.

37. The invention set forth in claim 36 wherein said preset number is distributed between said misspelled character string and said dictionary character strings.

38. The invention set forth in claim 36 wherein said terminating means includes means for tracking substitutional errors between characters of said misspelled word and characters of said dictionary words.

39. The invention set forth in claim 36 wherein said terminating means includes means for tracking transpositional errors between characters of said misspelled word and characters of said dictionary words.

40. The invention set forth in claim 30 further comprising means for changing said comparing sequence dependent upon prior compared words.

41. In a communication system, an arrangement for communicating between at least two terminals of said system, said arrangement comprising
    means for accepting at a first terminal, a name to which communication is to be directed,
    means for comparing an accepted name to a directory of defined names,
    means for selecting from said directory the closest name to said accepted name, and
    means controlled by said selection means for retrieving from said directory control information associated with said closest directory name.

42. The invention set forth in claim 41 further comprising means for changing said comparing sequence dependent upon prior compared names.

43. The invention set forth in claim 41 further comprising
    means controlled by said retrieved control information for establishing communication between said first terminal and other terminals associated with said presented name.

44. The invention set forth in claim 41 wherein said closest name is defined as the name in said directory requiring the smallest number of modifications to be transformed into said accepted name.

45. The invention set forth in claim 41 wherein each said directory name includes strings of characters and said accepted name includes strings of characters, and wherein said comparing means includes
    means for subdividing said directory of character strings into at least one subdirectory of character strings having bounds defined by a character of said provided character string, and
    means for examining said subdirectory for matches between a particular character of said provided character string and a particular character of said subdirectory character string.

46. The invention set forth in claim 45 wherein said subdividing and said examining means are recursively enabled by changing either the provided name character or the directory name character.

47. The invention set forth in claim 41 wherein said selecting means includes means for identifying matches between characters.

48. A system for providing directory look up, said system comprising
    means for subdividing a given directory into a subdirectory of names having bounds defined by a certain character of a presented name,
    means for recursively examining said subdirectory names for matches between a certain presented name character and a certain subdirectory character, said examination to cease when the last character of the presented name has been examined and when the first character string in the subdirectory is zero,
    means for calculating an error number for each subdirectory string of characters where matches occur, and
    means for sequentially providing indications of the directory names having error numbers lower than a preestablished number.

49. The invention set forth in claim 48 wherein said sequentially providing means includes means controlled by said error number calculation.

50. The invention set forth in claim 48 wherein said recursive means is controlled by said error number calculation.

51. The invention set forth in claim 48 wherein said examination of a subdirectory ceases when a preset error number is reached.

52. In a computer system, an algorithm for solving the problem of identifying from a set of character strings a particular character string that most closely resembles an input character string, said algorithm comprising the steps of decomposing said original problem into smaller subproblems in which smaller subdirectories, consisting of characters from said original directory, are searched to identify character strings closely resembling character strings obtained by removing characters from said input character string, and selecting from any said identified character strings, said particular character string.

53. The invention set forth in claim 52 wherein said subproblems are recursively decomposed into smaller subproblems until the resulting subproblems are ones in which a string with no characters is to be found in a directory in which the first string has no characters.

54. The invention set forth in claim 52 wherein three classes of subproblems are defined based on the following possibilities, (a) that the first character of each input string is correct, (b) that the first character of each input string is an extraneous character which should be discarded, and (c) that each input string is missing a character that should be inserted before the first character of that input string.

55. The invention set forth in claim 54 wherein said first class (a) of subproblems is investigated by a method comprising the steps of identifying the portion of the directory in which the first character of the input string is matched by the first character of the directory strings, said portion to be known as the matching portion of the directory, and searching a directory obtained from the matching portion by removing the first character from each string in said matching portion for a character string closely resembling the input string with its first character removed.

56. The invention set forth in claim 55 wherein said second class (b) of subproblems is investigated by finding a string in the directory that closely resembles the input string with its first character removed.

57. The invention set forth in claim 55 wherein said third class (c) of the subproblems is investigated by searching for a string that closely resembles the input string in a directory obtained from the original directory by removing the first character from each string.

58. The invention set forth in claim 57 wherein the string in the original directory corresponding to the first string the directory of a trivial subproblem is defined to be at a distance of n from the original input string if the sequence of subproblems from the original problem to the trivial subproblem involves some number of class (b) and class (c) subproblems totaling n.

59. The invention set forth in claim 58 wherein a subproblem is not investigated if the number of class (b) and class (c) subproblem from the original problems to the current subproblem is greater than or equal to the distance between the original input string and some previously identified directory string.

* * * * *

UNITED STATES PATENT AND TRADEMARK OFFICE
CERTIFICATE OF CORRECTION

PATENT NO. : 4,453,217

DATED : June 5, 1984

INVENTOR(S) : Richard H. Boivie

It is certified that error appears in the above-identified patent and that said Letters Patent is hereby corrected as shown below:

Column 17, line 32: "least subdictionary" should read --least one subdictionary--.

Signed and Sealed this

Fifteenth Day of January 1985

[SEAL]

Attest:

GERALD J. MOSSINGHOFF

Attesting Officer

Commissioner of Patents and Trademarks